US012776607B2

(12) United States Patent
Tang

(10) Patent No.: US 12,776,607 B2
(45) Date of Patent: Oct. 27, 2026

(54) CONNECTOR ASSEMBLY

(71) Applicant: Bellwether Electronic (Kunshan) Co., Ltd, Kunshan City (CN)

(72) Inventor: Xiang-Biao Tang, Kunshan City (CN)

(73) Assignee: BELLWETHER ELECTRONIC (KUNSHAN) CO., LTD, Kunshan City (CN)

( * ) Notice: Subject to any disclaimer, the term of this patent is extended or adjusted under 35 U.S.C. 154(b) by 336 days.

(21) Appl. No.: 18/603,225

(22) Filed: Mar. 13, 2024

(65) Prior Publication Data

US 2025/0219327 A1 Jul. 3, 2025

(30) Foreign Application Priority Data

Dec. 29, 2023 (TW) ................................ 112151473

(51) Int. Cl.

| | |
|---|---|
| ***H01R 13/639*** | (2006.01) |
| ***H01R 12/53*** | (2011.01) |
| ***H01R 13/05*** | (2006.01) |
| ***H01R 13/424*** | (2006.01) |
| ***H01R 13/516*** | (2006.01) |

(52) U.S. Cl.

CPC ........... *H01R 13/639* (2013.01); *H01R 12/53* (2013.01); *H01R 13/052* (2013.01); *H01R 13/424* (2013.01); *H01R 13/516* (2013.01)

(58) Field of Classification Search

CPC .... H01R 13/639; H01R 12/53; H01R 13/052; H01R 13/424; H01R 13/516; H01R 13/645; H01R 13/6275; H01R 12/7088

See application file for complete search history.

(56) References Cited

U.S. PATENT DOCUMENTS

| | | | | |
|---|---|---|---|---|
| 11,502,441 B1 * | 11/2022 | Tang | .................... | H01R 13/113 |
| 2021/0376507 A1 * | 12/2021 | Guo | ...................... | H01R 13/629 |
| 2022/0045459 A1 * | 2/2022 | Lin | ...................... | H01R 13/428 |
| 2022/0285870 A1 * | 9/2022 | Chang | .................. | H01R 13/187 |
| 2023/0198204 A1 | 6/2023 | Hung et al. | | |
| 2025/0219327 A1 * | 7/2025 | Tang | .................... | H01R 13/052 |

FOREIGN PATENT DOCUMENTS

| | | |
|---|---|---|
| CN | 216850571 U | 6/2022 |
| TW | I809976 B | 7/2023 |

* cited by examiner

*Primary Examiner* — Abdullah A Riyami
*Assistant Examiner* — Nader J Alhawamdeh
(74) *Attorney, Agent, or Firm* — Li & Cai Intellectual Property Office

(57) ABSTRACT

A connector assembly includes a board connector and a cable connector. When the board connector and the cable connector are inserted with each other, two conductive pillars of the board connector are inserted into two insertion slots of the cable connector, a board locking mechanism of the board connector is engaged with a cable locking mechanism of the cable connector, and the board locking mechanism and the cable locking mechanism are configured to jointly limit the board connector and the cable connector for enabling the board connector and the cable connector to be firmly connected to each other.

11 Claims, 28 Drawing Sheets

CONNECTOR ASSEMBLY

CROSS-REFERENCE TO RELATED PATENT APPLICATION

This application claims the benefit of priority to Taiwan Patent Application No. 112151473, filed on Dec. 29, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a connector assembly, and more particularly to a connector assembly including a board connector and a cable connector.

BACKGROUND OF THE DISCLOSURE

When a conventional board connector and a conventional cable connector are inserted with each other, the conventional board connector and the conventional cable connector are prone to have a loosening issue due to an unexpected external force, which may cause issues associated with transmission interruption or transmission quality degradation.

SUMMARY OF THE DISCLOSURE

In response to the above-referenced technical inadequacy, the present disclosure provides a connector assembly, which is mainly used for improving the loosening issue associated with the conventional board connector and the conventional cable connector that are inserted with each other.

In order to solve the above-mentioned issues, one of the technical aspects adopted by the present disclosure is to provide a connector assembly. The connector assembly includes a board connector and a cable connector. The board connector includes a circuit board, a board insulation seat, and at least two conductive pillars. The board insulation seat is fixed and disposed on the circuit board, and the board insulation seat includes a board locking mechanism. The two conductive pillars are fixed and disposed on the circuit board. The two conductive pillars pass through the board insulation seat through two through holes of the board insulation seat. The cable connector includes a cable insulation seat, at least two conductive members, at least two cables, and a cap. The cable insulation seat has two through holes, an accommodating space, and a cable locking mechanism. The two through holes of the cable insulation seat and the accommodating space are in spatial communication with each other. Each of the at least two conductive members has one of a plurality of insertion slots. The at least two conductive members are fixed and disposed in the accommodating space, and the accommodating space is in spatial communication with an external environment through the two through holes of the cable insulation seat. One end of each of the at least two cables is connected to a connection portion of one of the at least two conductive members. The cap is fixed to the cable insulation seat and covers the cable insulation seat. The at least two conductive pillars are respectively inserted into the insertion slots of the at least two conductive members, and the board locking mechanism and the cable locking mechanism are engaged and fixed with each other.

Therefore, by virtue of the structural designs of the cable locking mechanism and the board locking mechanism, the connector assembly provided by the present disclosure can effectively improve the loosening issue associated with the conventional board connector and the conventional cable connector that are inserted with each other.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
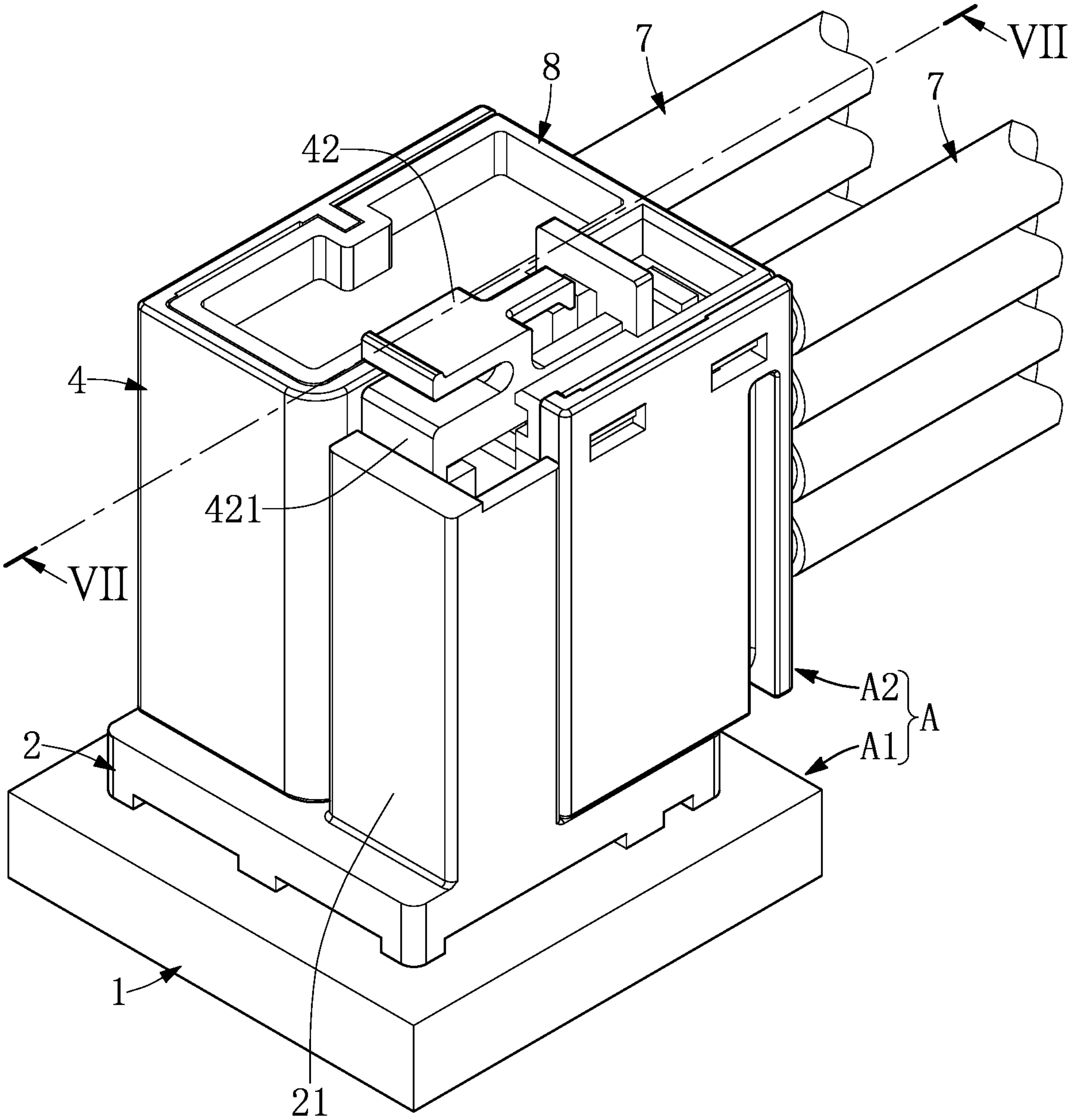
FIG. 1 and FIG. 2 are schematic assembled and exploded views of a connector assembly according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

As shown in FIG. 1 to FIG. 4, a connector assembly A of the present disclosure includes a board connector A1 and a cable connector A2. The cable connector A2 and the board connector A1 can be inserted with each other for transmission of electricity and for being applied to servers.

The board connector A1 includes a circuit board 1, a board insulation seat 2, and two conductive pillars 3. The board insulation seat 2 is fixed and disposed on a side of the circuit board 1, and the board insulation seat 2 includes a board locking mechanism 21. In addition, the board insulation seat 2 further includes a base 20 that can include the board locking mechanism 21. The two conductive pillars 3 are fixed and disposed on the circuit board 1 and pass through the base 20 through two through holes 201 of the board insulation seat 2. A quantity and locations of the conductive pillars 3 of the board connector A1 are not limited as in the drawings.

In the embodiments, the base 20 is substantially a rectangular flat plate structure, and the board locking mechanism 21 is disposed upright on the side of the base 20. The two conductive pillars 3 are disposed at two ends of a first diagonal line of the base 20, and the board locking mechanism 21 is disposed at one end of a second diagonal line of the base 20. Therefore, when the cable connector A2 and the board connector A1 are inserted with each other, the two conductive pillars 3 and the board locking mechanism 21 can provide a fixing on three positions to prevent the cable connector A2 and the board connector A1 from coming off from each other. Each of the two conductive pillars 3 can have an appearance close to a cylinder or a rectangular body.

The cable connector A2 includes a cable insulation seat 4, two conductive members 5, two auxiliary conductive members 6, two cables 7, and a cap 8. In the cable connector A2, a quantity of the conductive members 5, a quantity of the auxiliary conductive members 6, and a quantity of the cables 7 are not limited by the present embodiment. In certain embodiments, the cable connector A2 does not include the auxiliary conductive member 6.

A mating surface 4A of the cable insulation seat 4 has two through holes 41. Each of the two through holes 41 penetrates through the mating surface 4A of the cable insulation seat 4. A side of the cable insulation seat 4 is recessed to form an accommodating space S1. The cable insulation seat 4 has a cable locking mechanism 42 arranged on an outer side thereof (e.g., the cable locking mechanism 42 is arranged outside of the accommodating space S1).

Figure 2:
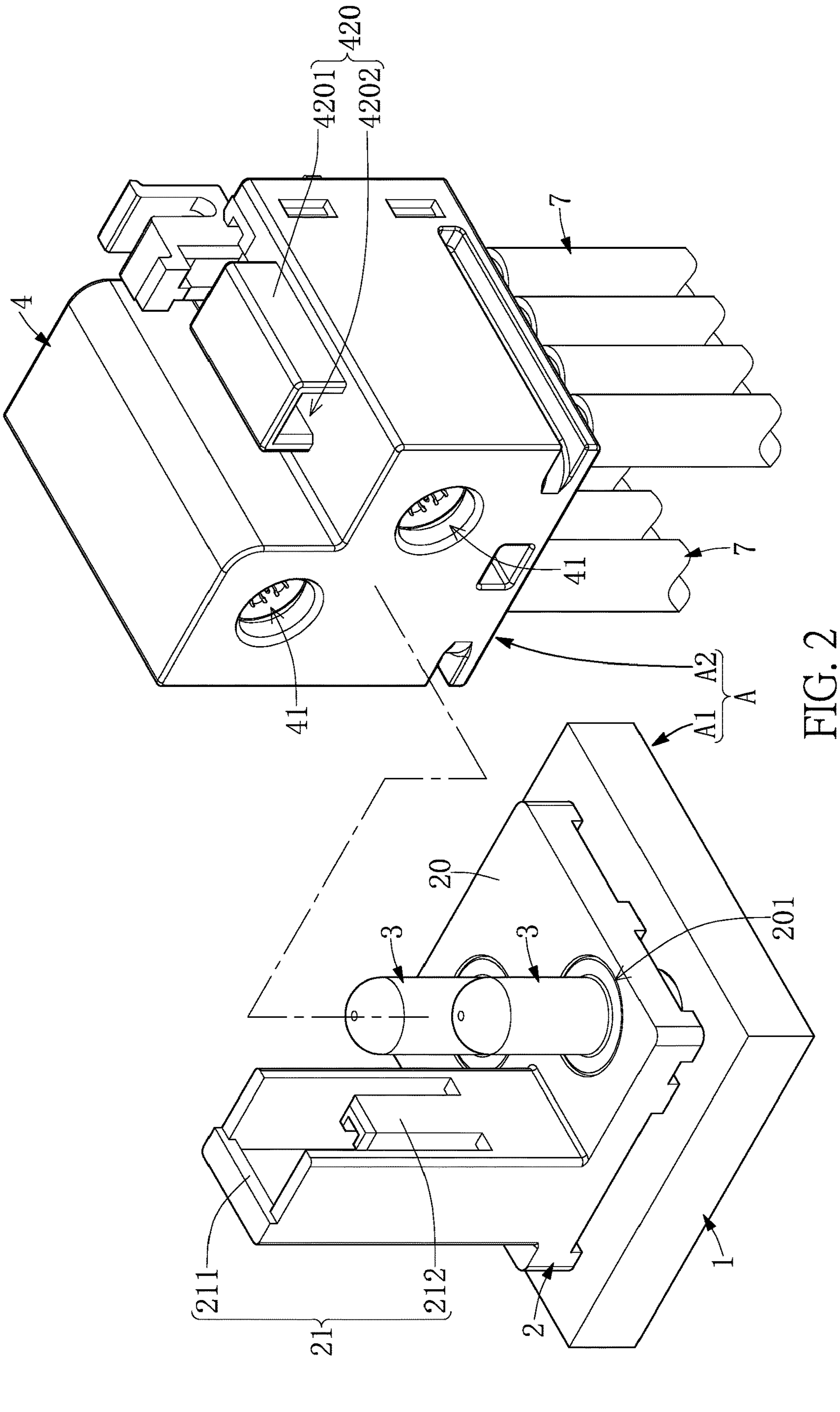
Figure 3:
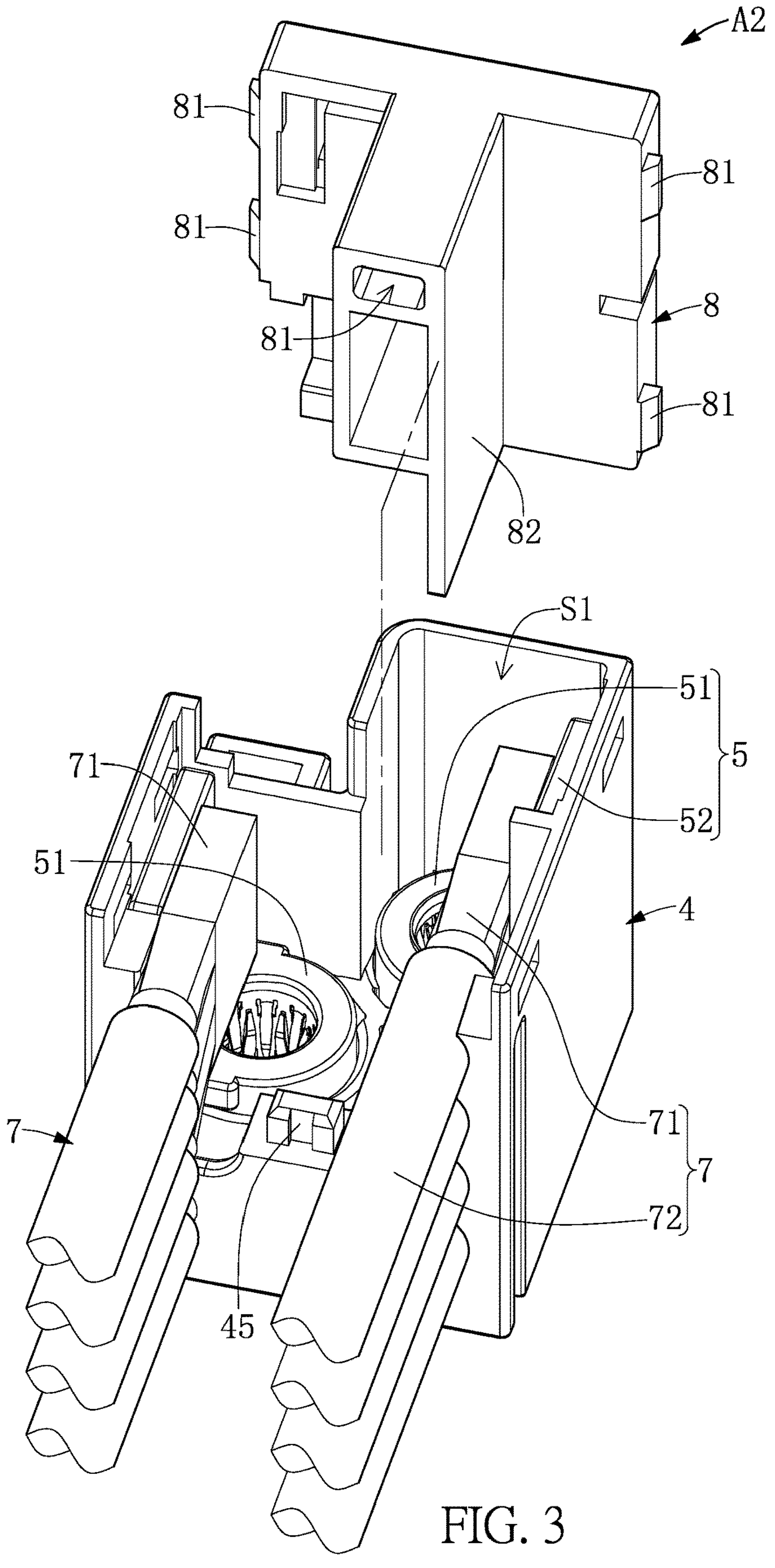
FIG. 3 and FIG. 4 are schematic partially exploded views of a cable connector according to the first embodiment of the present disclosure.
Figure 4:
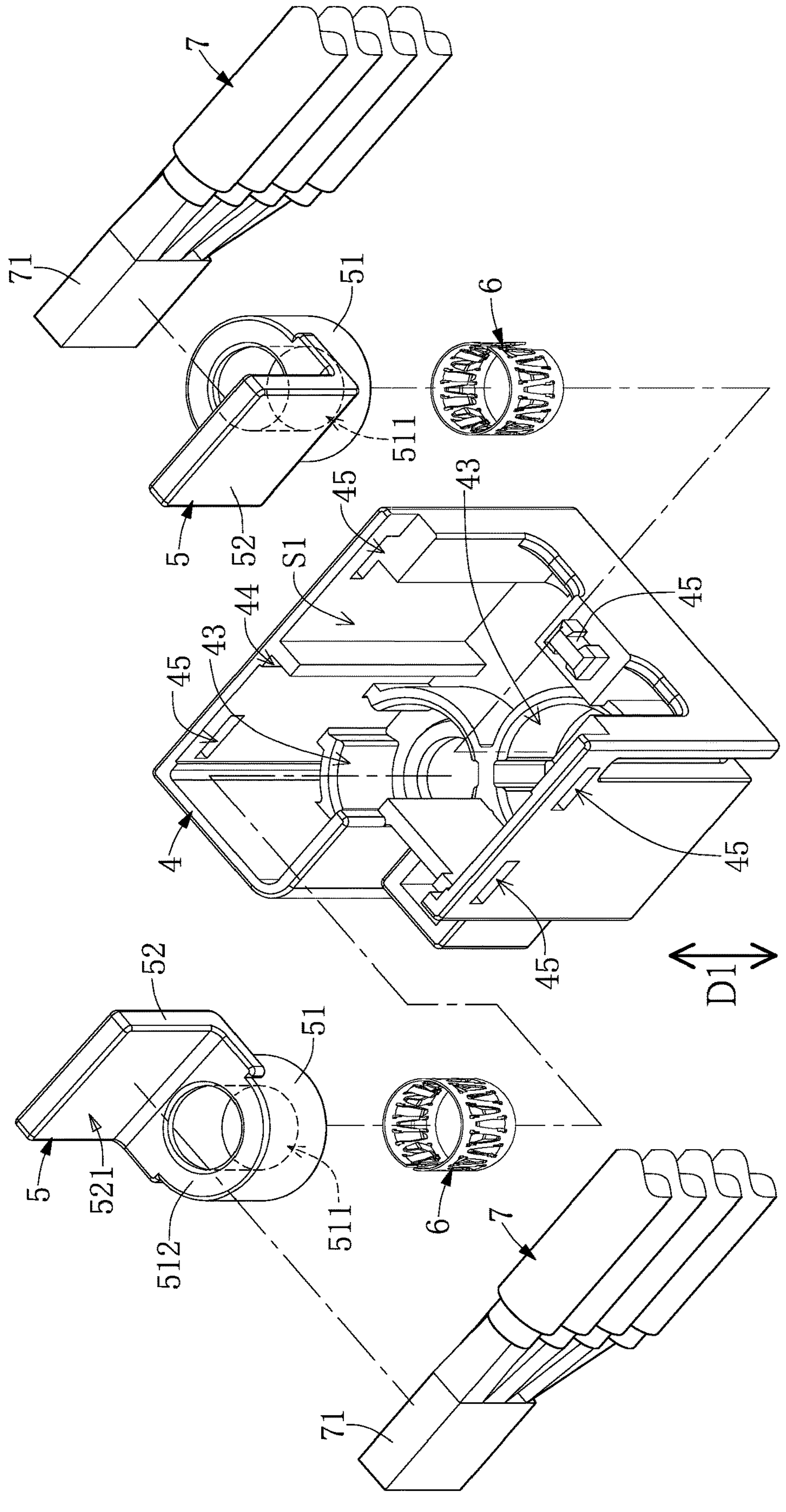

The two conductive members 5 are disposed in the cable insulation seat 4, and the two conductive members 5 are located in the accommodating space S1. As shown in FIG. 2 to FIG. 4, the cable insulation seat 4 has two engaging grooves 43 arranged on the side of the cable insulation seat 4 having the accommodating space S1, each of the two engaging grooves 43 and the two through holes 41 are respectively in spatial communication with each other, and a part of each of the two conductive members 5 are engaged and fixed in one of the two engaging grooves 43.

As shown in FIG. 4, each of the two conductive members 5 includes a main body 51 and a connection portion 52, and the main body 51 has an insertion slot 511 that penetrates through the main body 51 or does not penetrate through the main body 51. The main body 51 is substantially a cylindrical structure, and the connection portion 52 is substantially a rectangular flat plate structure, but the present disclosure is not limited thereto. The connection portion 52 and the main body 51 are connected to each other, and the connection portion 52 extends outward from the main body 51.

In practice, the cable insulation seat 4 further includes two fixing grooves 44, and each of the two fixing grooves 44 is configured to be engaged with one of the conductive members 5 or the connection portion 52 of one of the conductive members 5. Through the design of the engaging grooves 43 and the fixing grooves 44, the connection strength between the conductive members 5 and the cable insulation seat 4 can be enhanced.

As shown in FIG. 4 to FIG. 7, the insertion slot 511 of each of the conductive members 5 has an auxiliary conductive member 6 disposed therein. Each of the auxiliary conductive members 6 is a sheet-like structure. Each of the auxiliary conductive members 6 includes a sheet body 61 and a plurality of conductive elastic arms 62, one end of each of the conductive elastic arms 62 is connected to the sheet body 61, and another end of each of the conductive elastic arms 62 is a free end 622. When each of the conductive elastic arms 62 is pressed, the conductive elastic arm 62 is elastically deformed. Each of the auxiliary conductive members 6 can be bent to substantially be a cylindrical structure and is then fixed and disposed into the insertion slot 511 of one of the conductive members 5.

Figure 6:
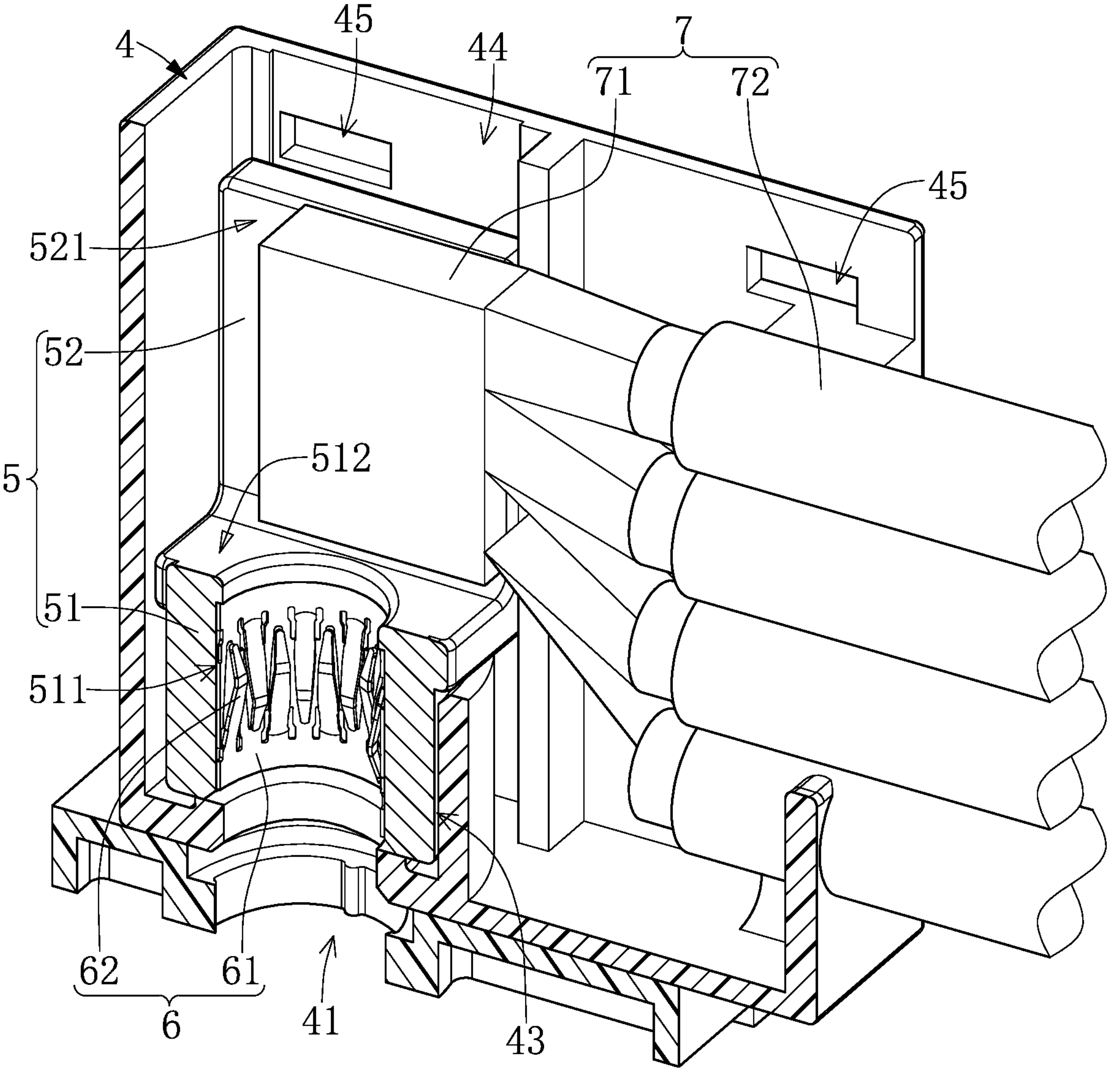
FIG. 6 is a schematic partially cross-sectional view of the cable connector according to the first embodiment of the present disclosure.
Figure 7:
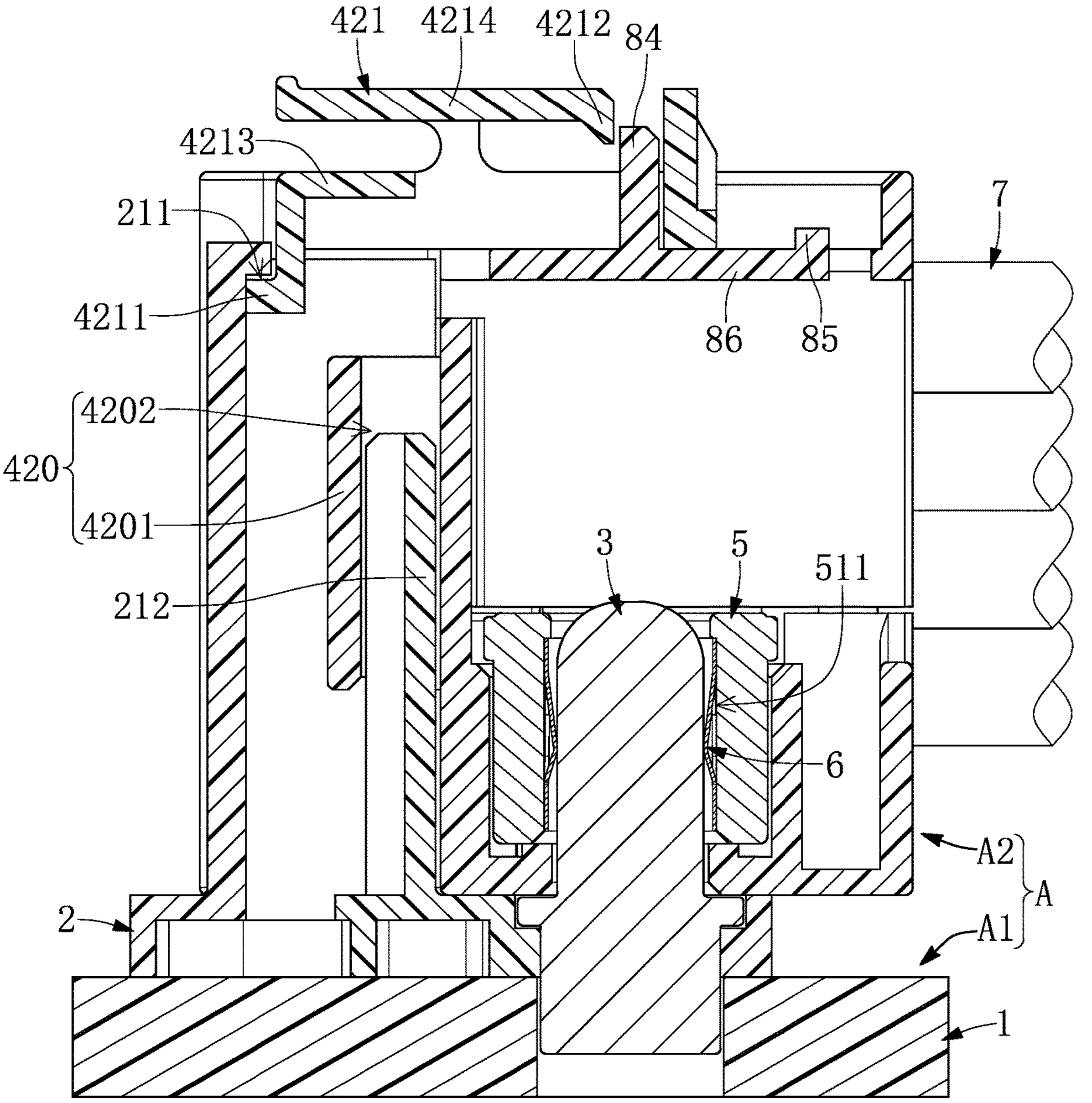
FIG. 7 is a schematic cross-sectional view taken along line VII-VII of FIG. 1.

As shown in FIG. 6 and FIG. 7, when the board connector A1 and the cable connector A2 are inserted with each other, the two conductive pillars 3 are respectively inserted into the two insertion slots 511, and each of the auxiliary conductive members 6 is located between one of the conductive pillars 3 and the corresponding conductive member 5, such that at least part of the conductive elastic arms 62 are elastically deformed by being squeezed between an inner wall of the corresponding insertion slot 511 and a corresponding one of the at least two conductive pillars 3 that is adjacent to the corresponding insertion slot 511. Therefore, through the arrangement of the auxiliary conductive member 6, a force applied on a contact area of the conductive pillar 3 and the conductive member 5 can be effectively enhanced, thereby improving quality of a signal transmission or an electricity transmission.

Figure 5:
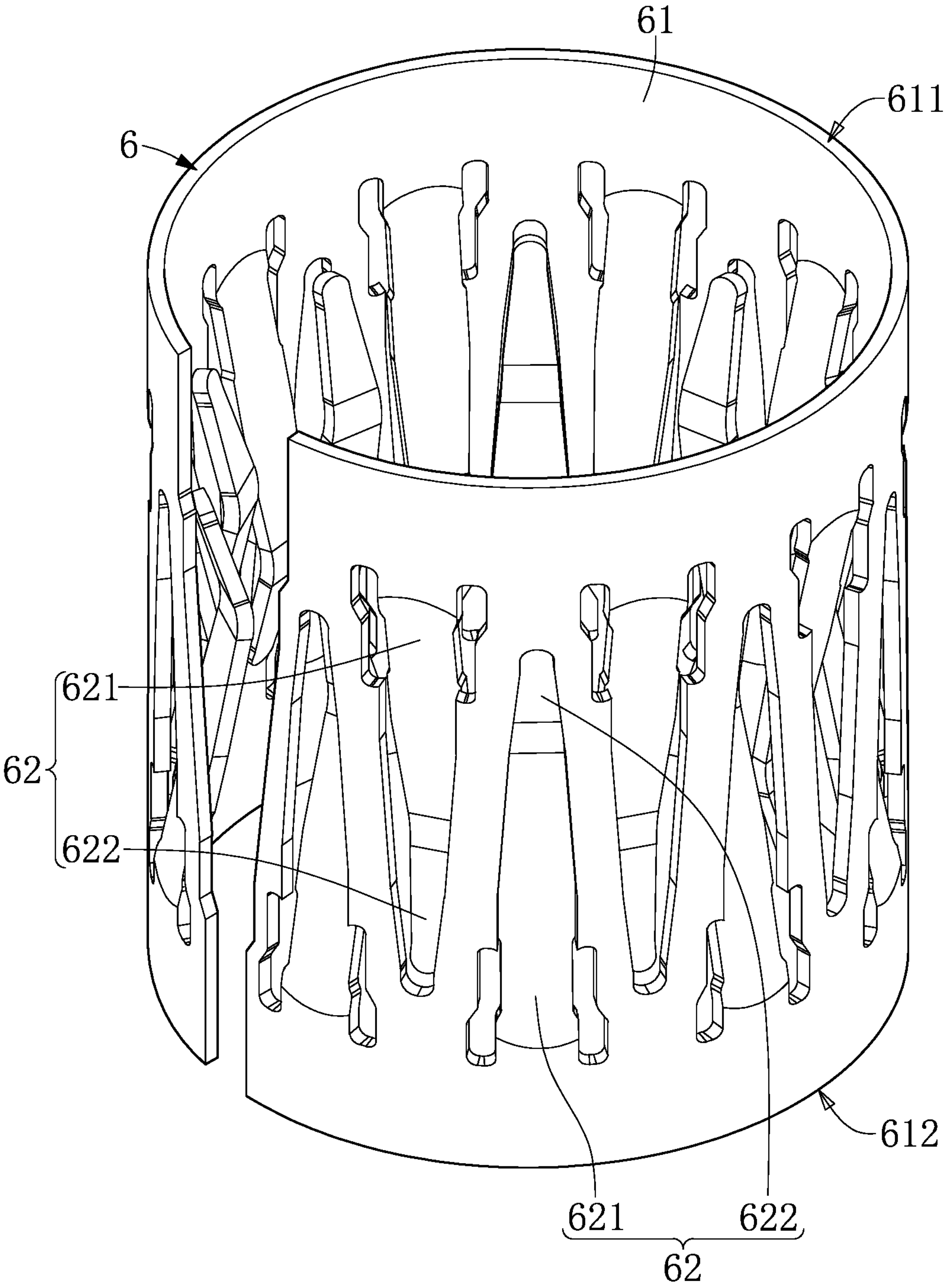
FIG. 5 is a schematic view of an auxiliary conductive member according to the first embodiment of the present disclosure.

As shown in FIG. 5, a feet portion 621 of each of the conductive elastic arms 62 connected to the sheet body 61 is disposed adjacent to the a free end 622 of an adjacent one of the conductive elastic arms 62, and the feet portions 621 of two adjacent conductive elastic arms 62 are respectively disposed toward (or adjacent to) an upper edge 611 and a lower edge 612 of the sheet body 61. In other words, the two free ends 622 of two adjacent conductive elastic arms 62 are respectively disposed toward (or adjacent to) the upper edge 611 and the lower edge 612 of the sheet body 61. If the free ends 622 of all of the conductive elastic arms 62 are disposed in a same direction, when the conductive pillars 3 are inserted into the insertion slots 511, the operation of plugging or unplugging between the cable connector A2 and the board connector A1 becomes inconvenient.

As shown in FIG. 4 and FIG. 6, each of the cables 7 includes a fixing structure 71 and a plurality of wires 72, and one end of core wires (e.g., copper wires) of the wires 72 is connected to the fixing structure 71. The fixing structure 71 is a copper block formed by melting or welding the core wires of the wires 72. The fixing structure 71 is fixed to the connection portion 52 of the conductive member 5 and the fixing structure 71 can be fixed to the connection portion 52 by ultrasonic welding. In order to facilitate the connection between the fixing structure 71 and the connection portion 52, each of the connection portions 52 includes a bonding surface 521, and the fixing structure 71 is fixed onto the bonding surface 521.

In practice, the main body 51 of each of the conductive members 5 includes an resistance surface 512, and the bonding surface 521 and the resistance surface 512 are respectively located on two planes that are not parallel to each other. The bonding surface 521 and the resistance surface 512 are perpendicular to each other. At least part of each of the fixing structures 71 is fixed on one of the bonding surfaces 521, and each of the resistance surfaces 512 is provided for allowing the fixing structure 71 to abut against the resistance surface 512 or fixed on the resistance surface 512. The fixing structure 71 is fixed to the bonding surface 521 and the resistance surface 512, such that the connection strength between the fixing structure 71 and the conductive member 5 can be enhanced.

Figure 8:
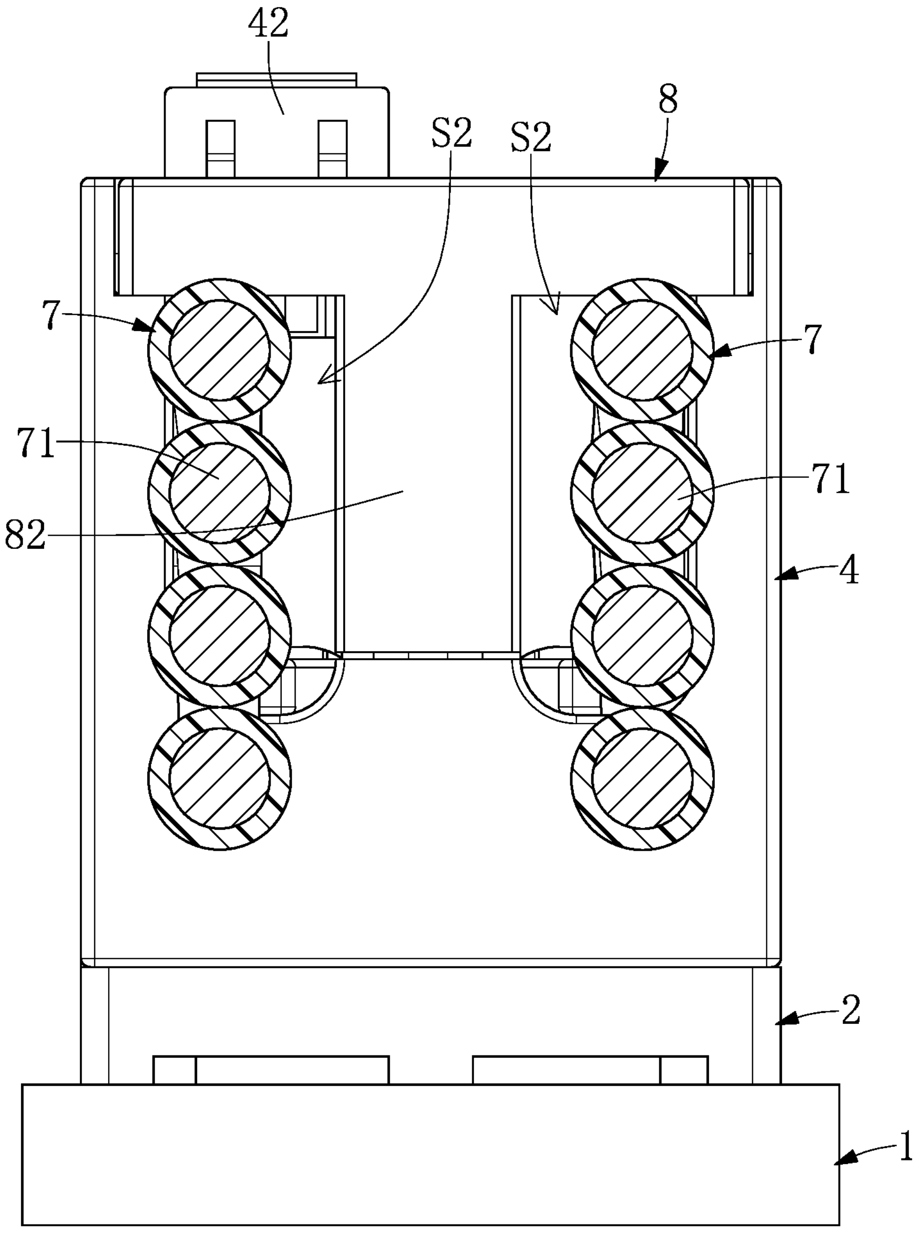
FIG. 8 is a side view of the connector assembly according to the first embodiment of the present disclosure.

As shown in FIG. 3, FIG. 4, and FIG. 8, the cap 8 is disposed in the cable insulation seat 4, and the cap 8 and the cable insulation seat 4 can jointly shield the two conductive members 5 and junctions between the two cables 7 and the connection portions 52. The cap 8 can include a plurality of cap engaging structures 81, the cable insulation seat 4 corresponds to a plurality of insulation base engaging structures 45, the cap 8 is engaged with the insulation base engaging structures 45 through the cap engaging structures 81, and the cap 8 is fixed in a side of the cable insulation seat 4. The appearance, quantity, and location of the cap engaging structures 81 are not limited by the drawings and can be changed according to practical requirements.

The cap 8 further includes a block wall structure 82. When the cap 8 is fixed to the cable insulation seat 4, the accommodating space S1 of the cable insulation seat 4 can be partitioned into two accommodating cable spaces S2 through the block wall structure 82, and the junctions between the two cables 7 and the two connection portions 52 are respectively located in the two accommodating cable spaces S2. Through the design of the block wall structure 82, the junctions between the two cables 7 and the connection portions 52 are separated from each other for effectively preventing interactions between the junctions.

As shown in FIG. 1 and FIG. 7, when the board connector A1 and the cable connector A2 are inserted with each other, the board locking mechanism 21 can be engaged with the cable locking mechanism 42, and the board locking mechanism 21 and the cable locking mechanism 42 can be configured to jointly limit the cable connector A2 and the board connector A1, thereby preventing the cable connector A2 and the board connector A1 from sliding and loosening relative to each other.

Figure 9:
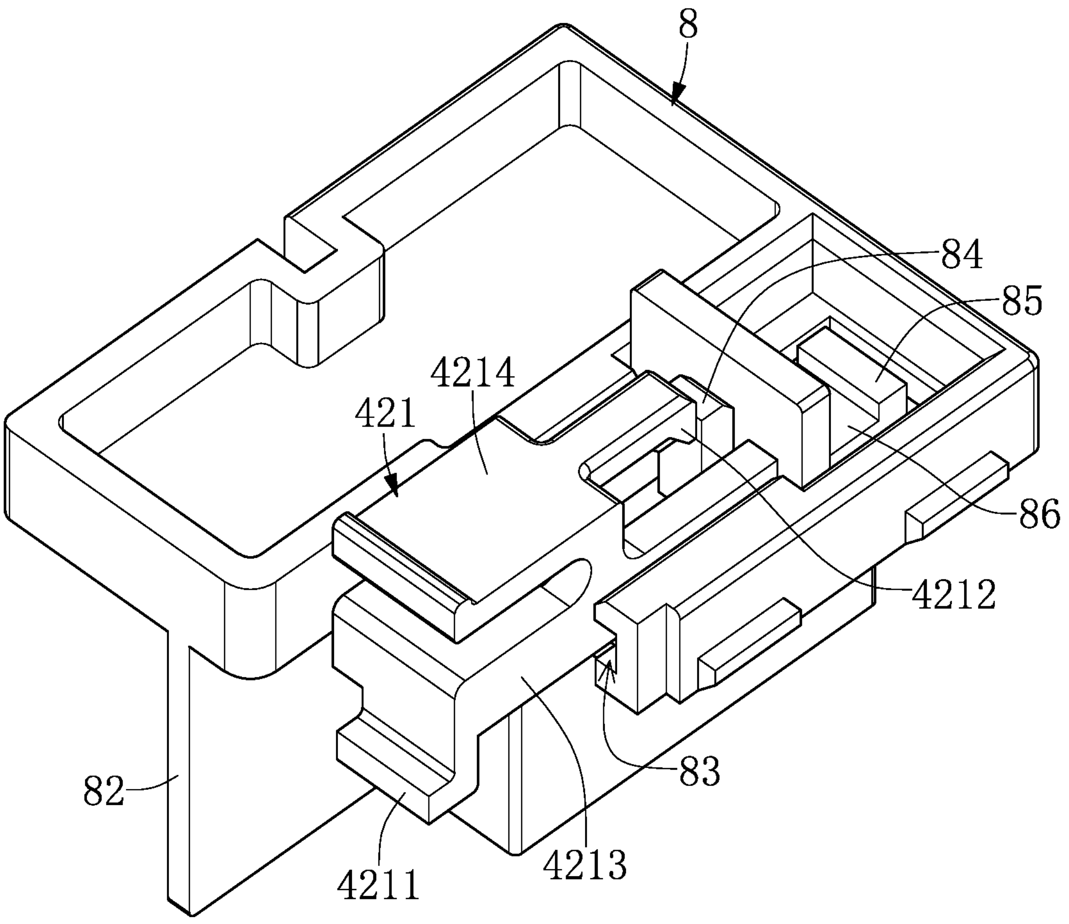
FIG. 9 and FIG. 10 are schematic assembled and exploded views of a cap and a sliding member of the cable connector according to the first embodiment of the present disclosure.
Figure 10:
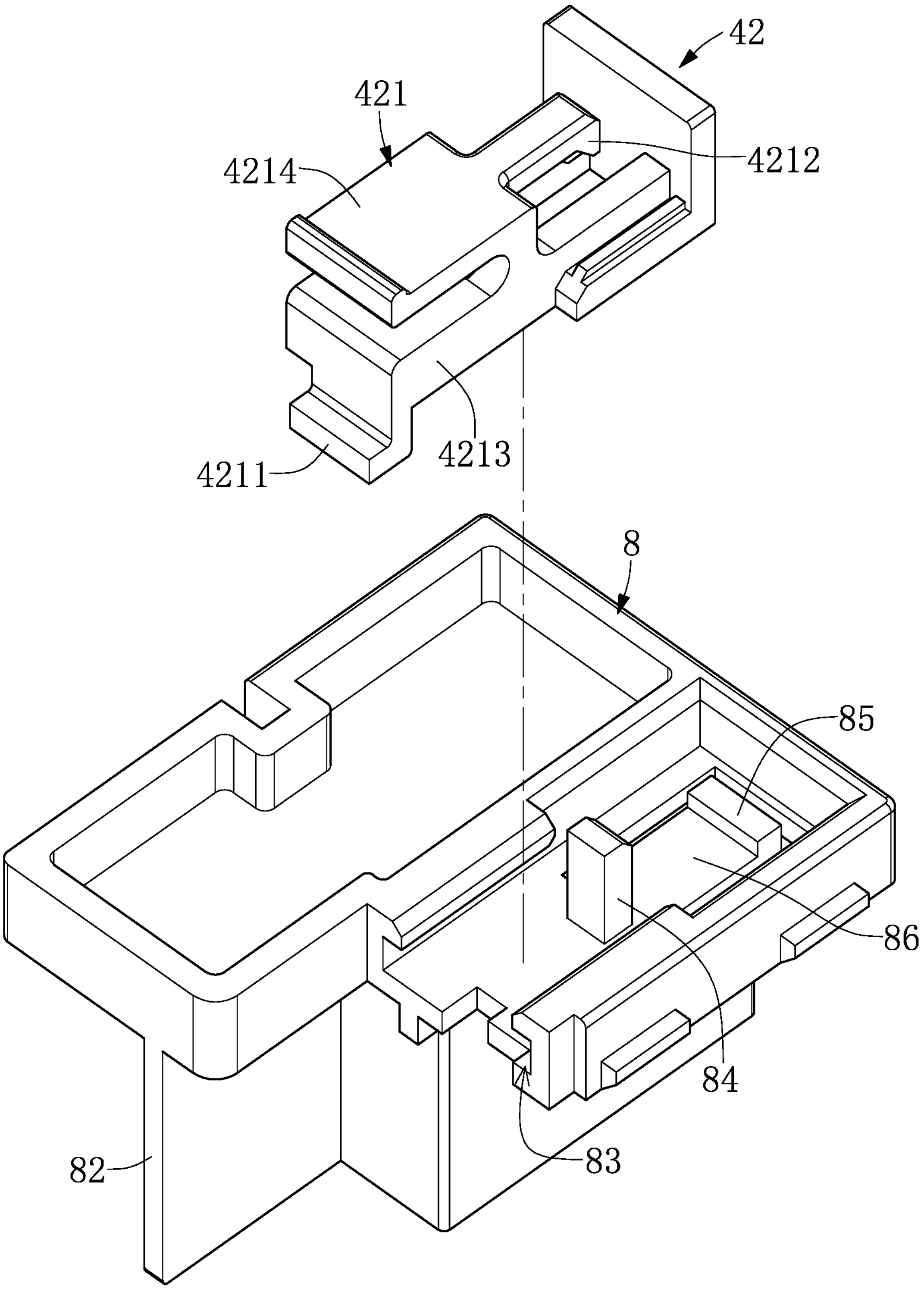

As shown in FIG. 7, FIG. 9, and FIG. 10, the cable locking mechanism 42 can include a sliding member 421. The sliding member 421 is slidably engaged and fixed with the cap 8. For example, a sliding groove 83 can be formed on a top portion of the cap 8, and the sliding member 421 is disposed in the sliding groove 83.

When the sliding member 421 is located at a locked position, a cable engaging structure 4211 of the sliding member 421 and a board engaging structure 211 of the board locking mechanism 21 are engaged with each other. For example, the cable engaging structure 4211 is a bump structure, and the board engaging structure 211 is substantially an inverted L-shaped structure. When the sliding member 421 is located at the locked position, the bump structure is engaged with the inverted L-shaped structure. Furthermore, when the sliding member 421 is located at the locked position, an resistance structure 4212 of the sliding member 421 is located at one side of a cap limiting structure 84 of the cap 8, and the resistance structure 4212 and the cap limiting structure 84 can be configured to jointly limit the movement range of the sliding member 421 relative to the board insulation seat 2.

In practice, the sliding member 421 includes a main body 4213, the cable engaging structure 4211 is arranged on one end of the main body 4213, the main body 4213 has an elastic arm 4214, one end of the elastic arm 4214 has the resistance structure 4212, and the elastic arm 4214 and the resistance structure 4212 substantially form an L-shaped structure. The cap limiting structure 84 is a rectangular column. When the sliding member 421 is located at the locked position, the resistance structure 4212 is located at one side of the rectangular column. In this state (as shown in FIG. 7), if the sliding member 421 is moved from the locked position to an unlocked position (e.g., a rightward direction of FIG. 7), the resistance structure 4212 abuts against the cap limiting structure 84, thereby limiting the sliding member 421 from moving to the unlocked position (as shown in FIG. 11).

As shown in FIG. 2 and FIG. 7, in practice, the board locking mechanism 21 and the cable locking mechanism 42 respectively have a positioning structure 212 and a positioning structure 420. When the board locking mechanism 21 and the cable locking mechanism 42 are engaged with each other, the two positioning structures 212 and 420 are also engaged with each other. For example, the positioning structure 212 is a column structure, the positioning structure 420 includes a frame 4201 and a through hole 4202, the frame 4201 is disposed in the cable insulation seat 4, and the frame 4201 and the cable insulation seat 4 jointly form the through hole 4202. When the two positioning structures 212 and 420 are engaged with each other, the column structure is relatively engaged with the through hole 4202. The two positioning structures 212 and 420 are configured to limit the movement range of the cable connector A2 and the board connector A1 along an X-axis direction and a Y-axis direction. The cable engaging structure 4211 of the sliding member 421 and the board engaging structure 211 are configured to limit the movement range of the cable connector A2 and the board connector A1 along a Z-axis direction.

Figure 11:
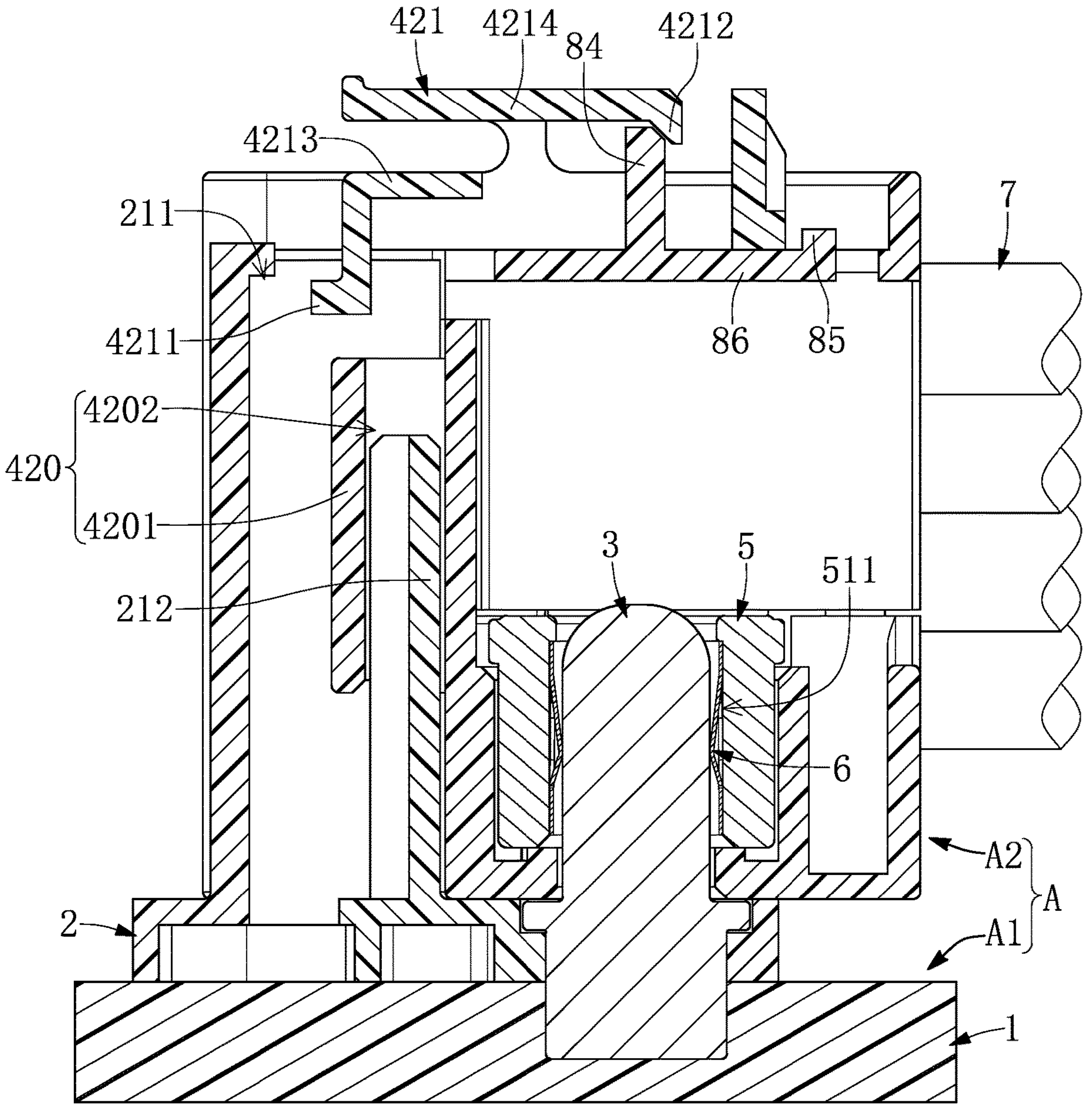
FIG. 11 and FIG. 12 are schematic cross-sectional views of the sliding member at different positions according to the first embodiment of the present disclosure.

As shown in FIG. 7 and FIG. 9 to FIG. 11, when a user wants to move the sliding member 421 from the locked position (as shown in FIG. 7) to the unlocked position (as shown in FIG. 11), the user presses another end of the elastic arm 4214 such that the resistance structure 4212 is elastically deformed in a direction away from the cap 8. Therefore, the sliding member 421 can be moved from the locked position to the unlocked position, and the resistance structure 4212 is moved to another side of the cap limiting structure 84.

As shown in FIG. 11, when the sliding member 421 is located at the unlocked position, the resistance structure 4212 is located at the another side of the cap limiting structure 84, and the resistance structure 4212 and the cap limiting structure 84 can be configured to jointly limit the movement range of the sliding member 421 relative to the cap 8. As shown in FIG. 11, if the user does not press the another end of the elastic arm 4214 of the sliding member 421, the resistance structure 4212 is not elastically deformed in a direction away from the cap limiting structure 84, such that the sliding member 421 is limited by the resistance structure 4212 and the cap limiting structure 84 and cannot be moved directly from the unlocked position to the locked position.

In summary, through the cooperation of the resistance structure 4212 of the sliding member 421 and the cap limiting structure 84, when the sliding member 421 is located at the locked position or the unlocked position and the another end of the elastic arm 4214 is not pressed, the sliding member 421 is difficult to slide relative to the cap 8, and the sliding member 421 is remained at the locked position or the unlocked position, thereby ensuring that the sliding member 421 can be stably located at the locked position or the unlocked position.

Figure 12:
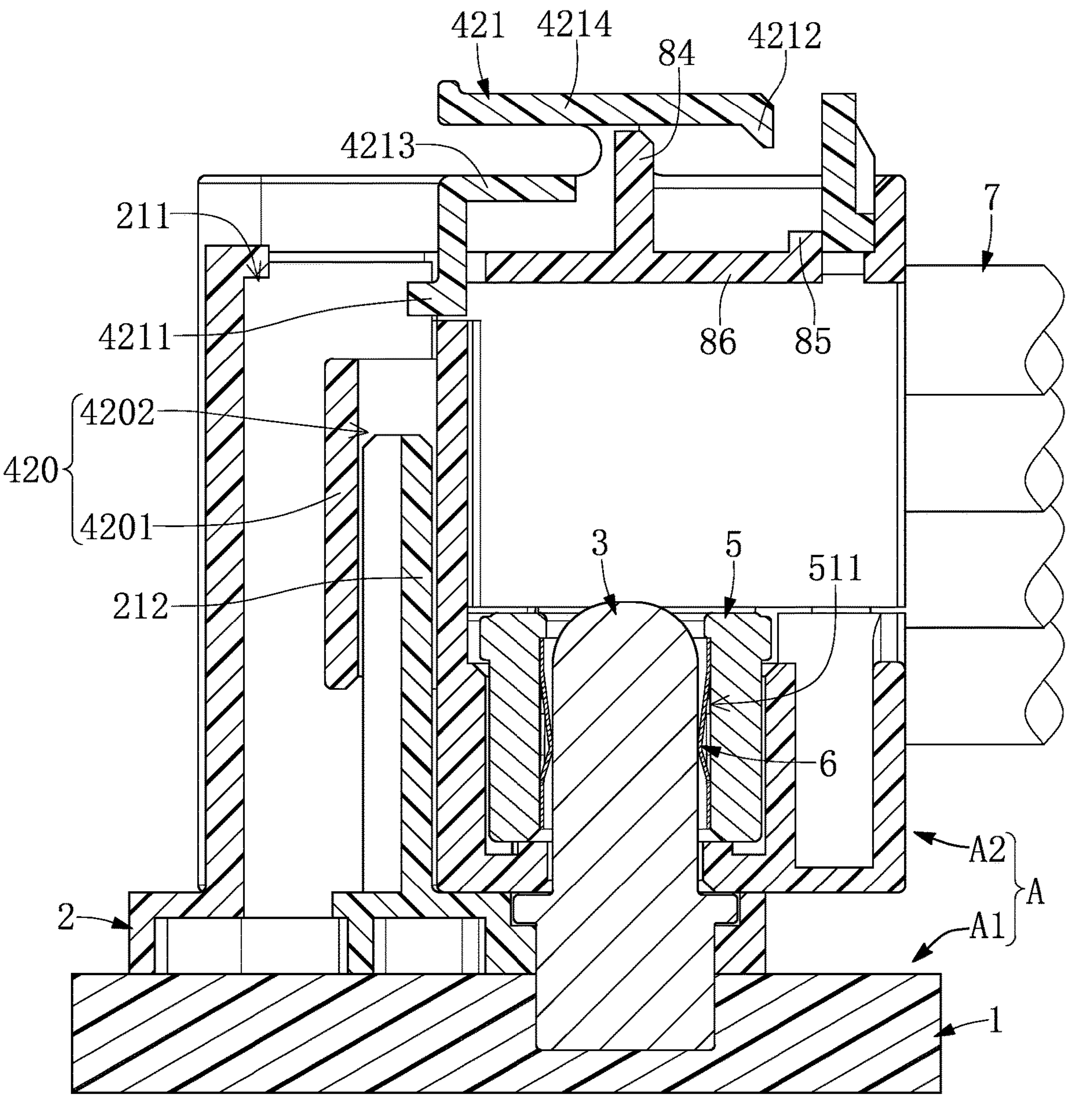

As shown in FIG. 7, FIG. 9, FIG. 10, and FIG. 12, the sliding member 421 can be moved between the locked position (as shown in FIG. 7), the unlocked position (as shown in FIG. 11), and a storage position (as shown in FIG. 12). When the sliding member 421 is located at the storage position as shown in FIG. 12, an auxiliary limiting structure 85 of the cap 8 can be configured to prevent the sliding member 421 from moving to the locked position or the unlocked position.

For example, the cap 8 includes a limiting elastic arm 86, one end of the limiting elastic arm 86 is connected to the cap 8, and another end of the limiting elastic arm 86 is a free end and has the auxiliary limiting structure 85. When the limiting elastic arm 86 is pressed, the limiting elastic arm 86 can be elastically deformed in a direction toward to the conductive pillars 3.

As shown in FIG. 12, when the sliding member 421 is located at the storage position, the auxiliary limiting structure 85 abuts against a part of the sliding member 421 to limit the movement range of the sliding member 421 relative to the cap 8. In other words, when the sliding member 421 is located at the storage position, the sliding member 421 is blocked by the auxiliary limiting structure 85, such that the sliding member 421 cannot be directly moved to the unlocked position or the locked position. Through the design of the limiting elastic arm 86 and the auxiliary limiting structure 85, the sliding member 421 is not inadvertently moved relative to the cap 8 after being located at the storage position.

When the user wants to move the sliding member 421 from the storage position to one of the unlocked position and the locked position, the user can press the limiting elastic arm 86 such that the limiting elastic arm 86 is elastically deformed and the auxiliary limiting structure 85 leaves a position where the auxiliary limiting structure 85 blocks the sliding member 421. Accordingly, the sliding member 421 can be moved from the storage position to the unlocked position or the locked position. It should be noted that, any structure that can be used to prevent the sliding member 421 located at the storage position from moving to the locked position or the unlocked position may be used as the auxiliary limiting structure 85.

Second Embodiment

Figure 13:
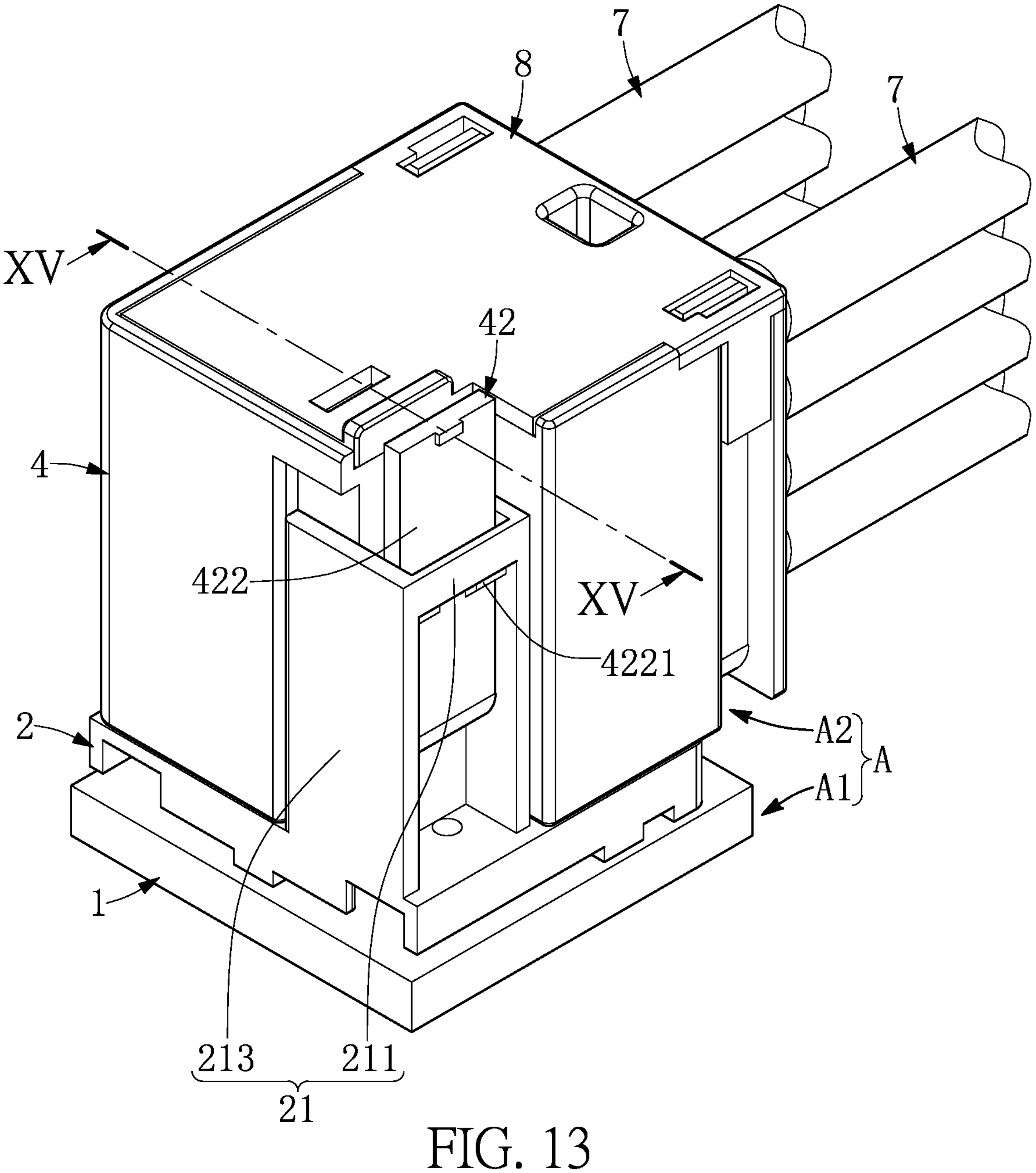
FIG. 13 and FIG. 14 are schematic assembled and exploded views of the connector assembly according to a second embodiment of the present disclosure.
Figure 14:
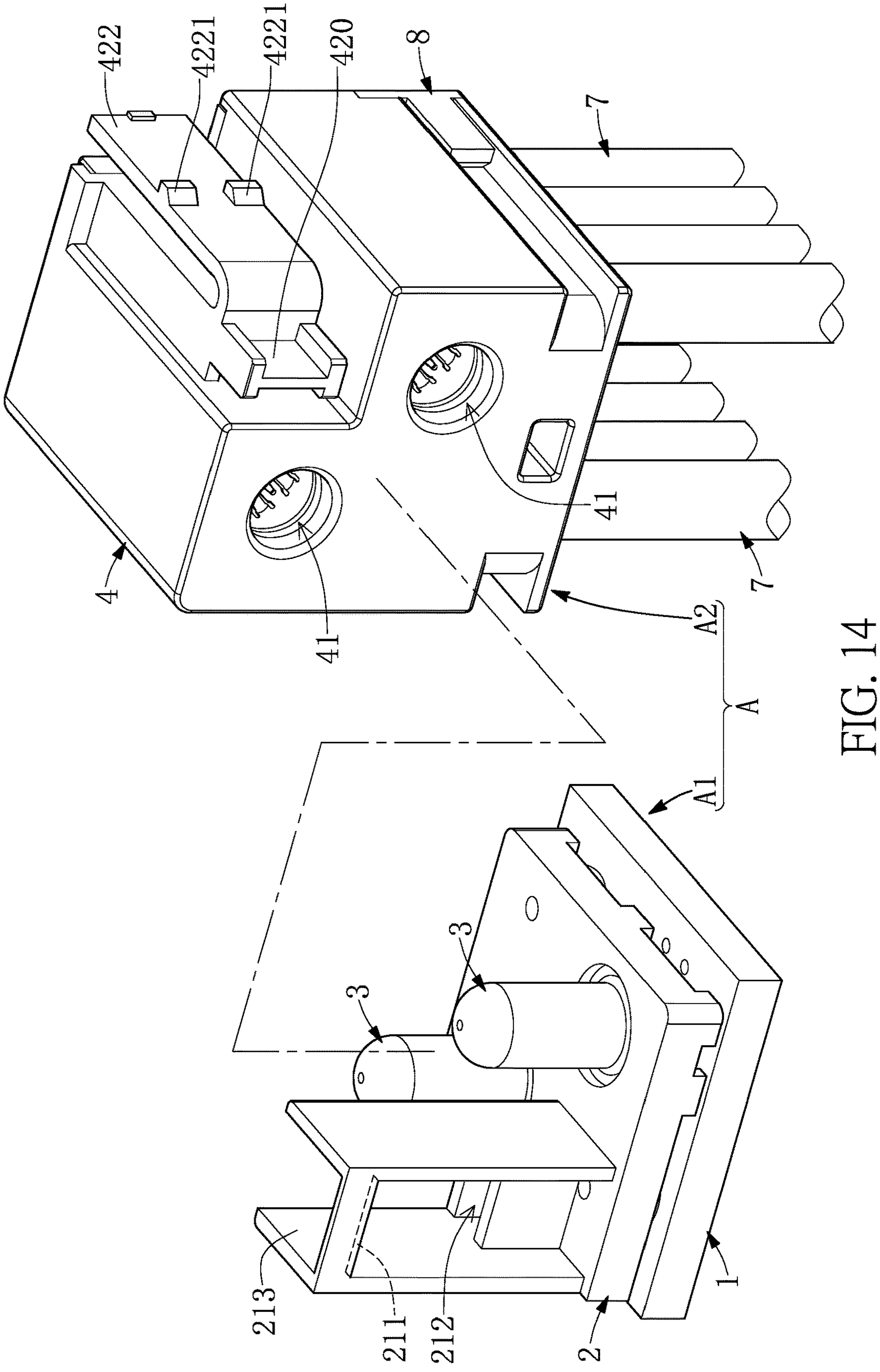
Figure 15:
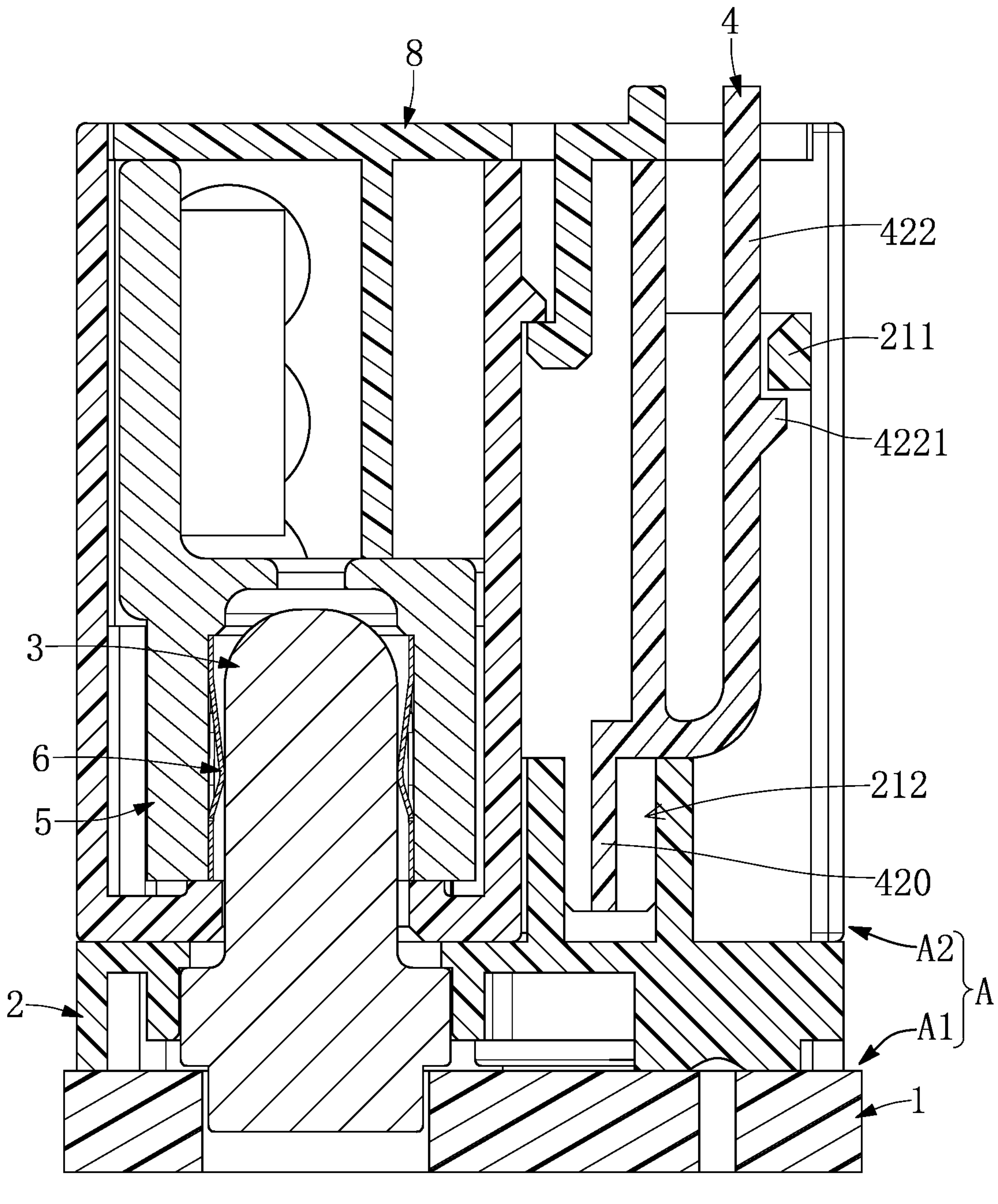
FIG. 15 is a schematic cross-sectional view taken along line XV-XV of FIG. 13.

As shown in FIG. 13 to FIG. 15, the difference between the present embodiment and the previous embodiment is described as follows: the cable locking mechanism 42 includes an elastic arm 422, one end of the elastic arm 422 is connected to the cable insulation seat 4, another end of the elastic arm 422 is a free end, and the elastic arm 422 has two cable engaging structures 4221 arranged on one side thereof. Each of the cable engaging structures 4221 is a bump structure, and the appearance and a quantity of the cable engaging structures 4221 are not limited by the drawings.

When the cable connector A2 and the board connector A1 are inserted with each other, the cable engaging structures 4221 are engaged with the board engaging structure 211 of the board locking mechanism 21, the cable engaging structures 4221 are engaged with the board engaging structure 211, and the cable engaging structures 4221 and the board engaging structure 211 are able to jointly limit the movement range of the board connector A1 and the cable connector A2.

When the cable connector A2 and the board connector A1 are inserted with each other, if the elastic arm 422 is pressed and elastically deformed, the cable engaging structure 4221 is not engaged with the board engaging structure 211, such that the cable connector A2 can be moved in a direction away from the board connector A1.

In practice, the board locking mechanism 21 includes a plurality of limiting portion 213, and the board engaging structure 211 is formed on one of the limiting portions 213 that has a front-end guiding function. When the cable connector A2 and the board connector A1 are inserted with each other, the board locking mechanism 21 is engaged with the cable engaging structure 4221 more accurately through the limiting portions 213.

In the present embodiment, the cable locking mechanism 42 and the board locking mechanism 21 respectively have the positioning structures 212 and 420. The positioning structure 212 is a column structure (e.g., an H-shaped column structure or a cylindrical column structure), and the positioning structure 420 can be a groove corresponding in shape to the column structure.

Third Embodiment

Figure 16:
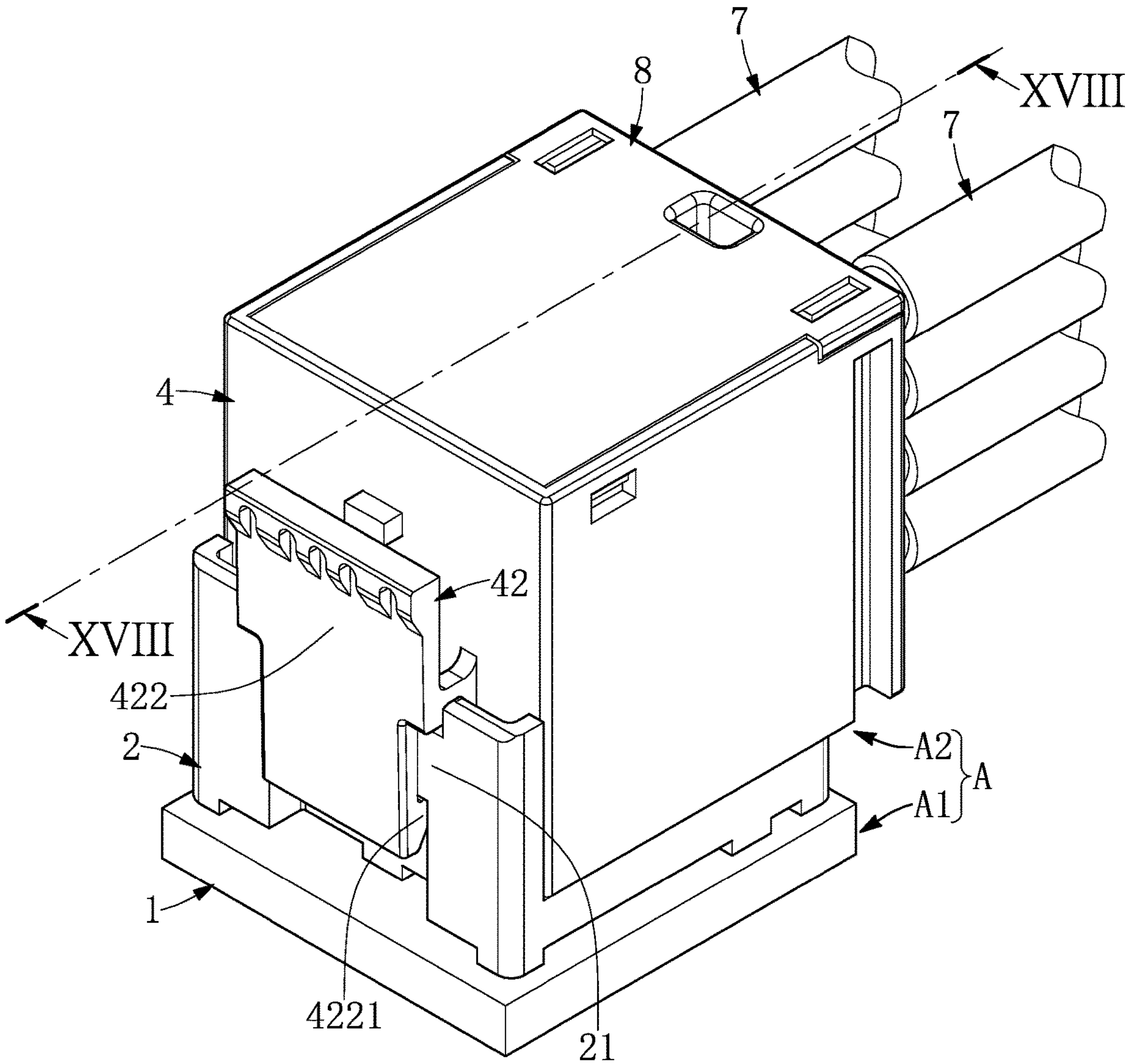
FIG. 16 and FIG. 17 are schematic assembled and exploded views of the connector assembly according to a third embodiment of the present disclosure.
Figure 17:
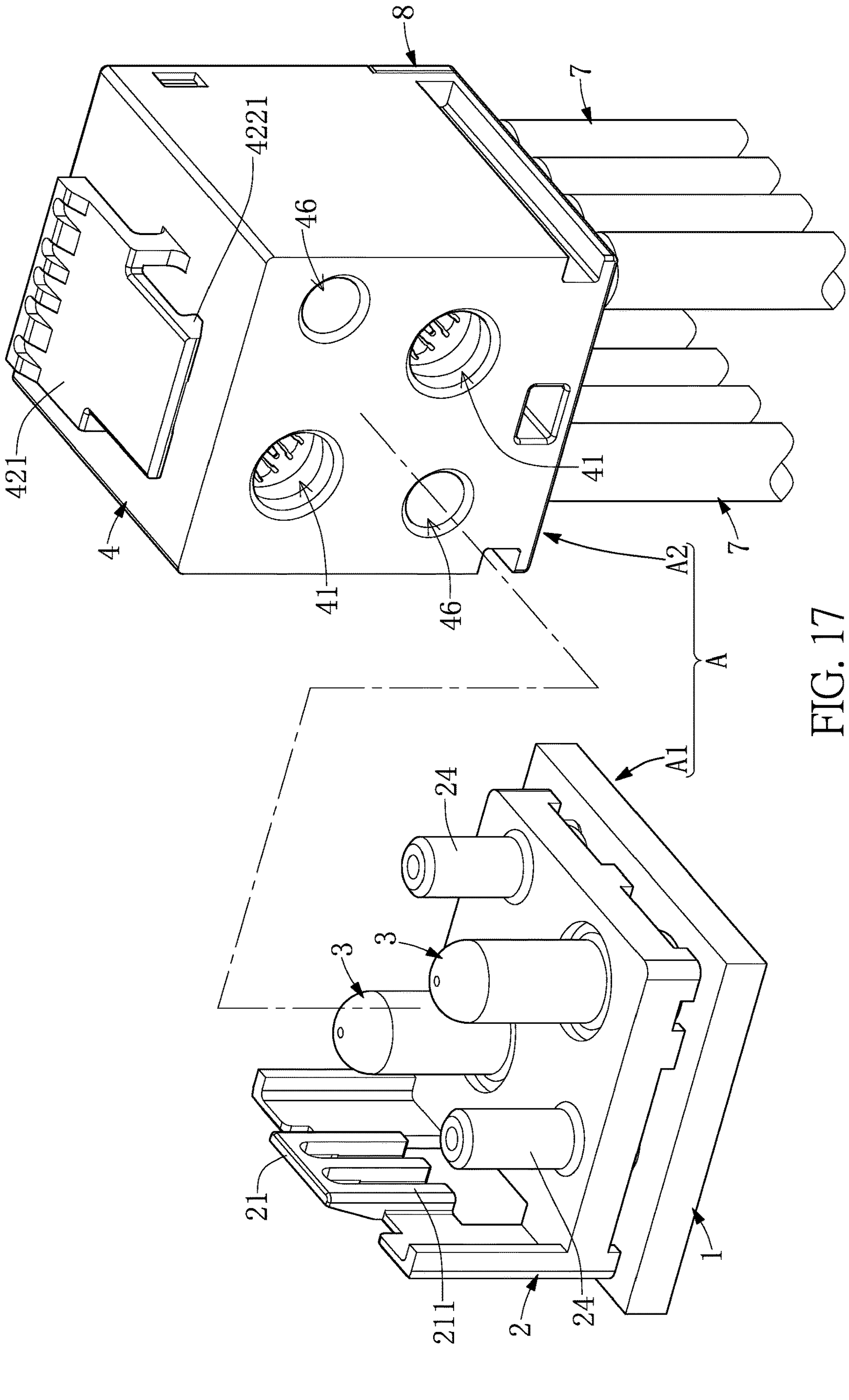
Figure 18:
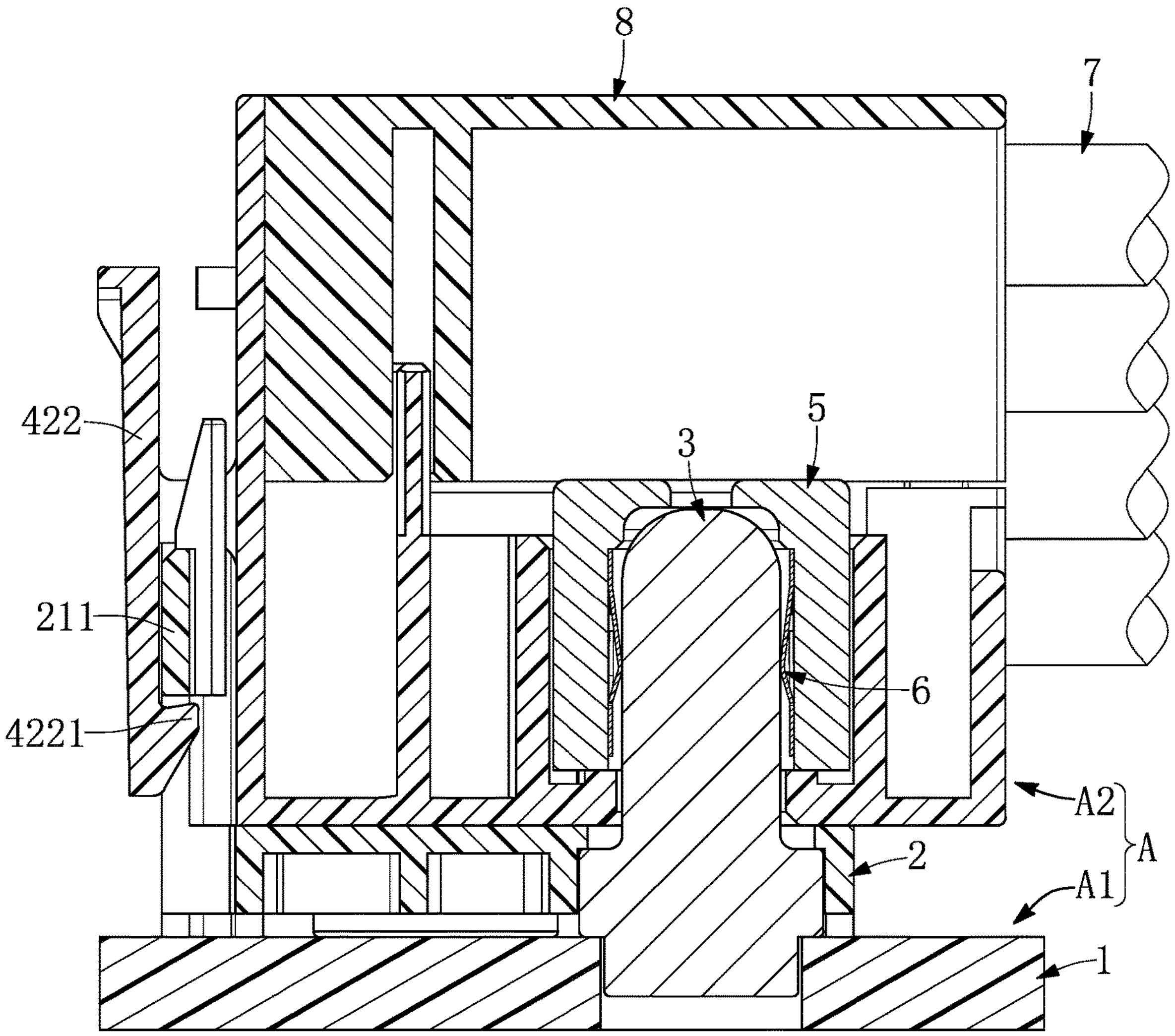
FIG. 18 is a schematic cross-sectional view taken along line XVIII-XVIII of FIG. 16.

As shown in FIG. 16 to FIG. 18, the cable locking mechanism 42 of the present embodiment also includes an elastic arm 422 having the cable engaging structure 4221. Moreover, in the present embodiment and the above-mentioned second embodiment, the difference between the board engaging structure 211 of the board locking mechanism 21 is only in the appearances, and the board engaging structures 211 of the two embodiments have a same function.

The differences between the present embodiment and the previous embodiments are described as follows: the board insulation seat 2 includes a plurality of board auxiliary limiting structures 24, the board auxiliary limiting structures 24 are column structures (e.g., cylindrical structures or rectangular column structures), and the board auxiliary limiting structures 24 and the conductive pillars 3 are disposed on a same side of the board insulation seat 2.

Correspondingly, the cable connector A2 includes a plurality of cable auxiliary limiting structures 46. For example, the cable insulation seat 4 has the cable auxiliary limiting structures 46, and each of the cable auxiliary limiting structures 46 can be a through hole or a concave hole. When the cable connector A2 and the board connector A1 are inserted with each other, the board auxiliary limiting structures 24 are engaged with the cable auxiliary limiting structures 46, and the board auxiliary limiting structures 24 and the cable auxiliary limiting structures 46 can be configured to jointly limit a rotation range of the cable connector A2 relative to the board connector A1. Accordingly, the cable connector A2 and the board connector A1 can be connected to each other more accurately.

In a preferred embodiment, the base 20 of the board insulation seat 2 is substantially a rectangular flat plate structure, the two conductive pillars 3 are located at two ends of one of the diagonal lines of the rectangular flat plate structure, and the two board auxiliary limiting structures 24 are located at two ends of another one of the diagonal lines of the rectangular flat plate structure. Accordingly, when the cable connector A2 and the board connector A1 are inserted with each other, the loosening and up-down sliding of the cable connector A2 and the board connector A1 can be greatly limited. Naturally, a quantity, the appearance, and the locations of the board auxiliary limiting structure 24 and the cable auxiliary limiting structures 46 included in the board connector A1 and the cable connector A2 are not limited thereto.

Fourth Embodiment

Figure 19:
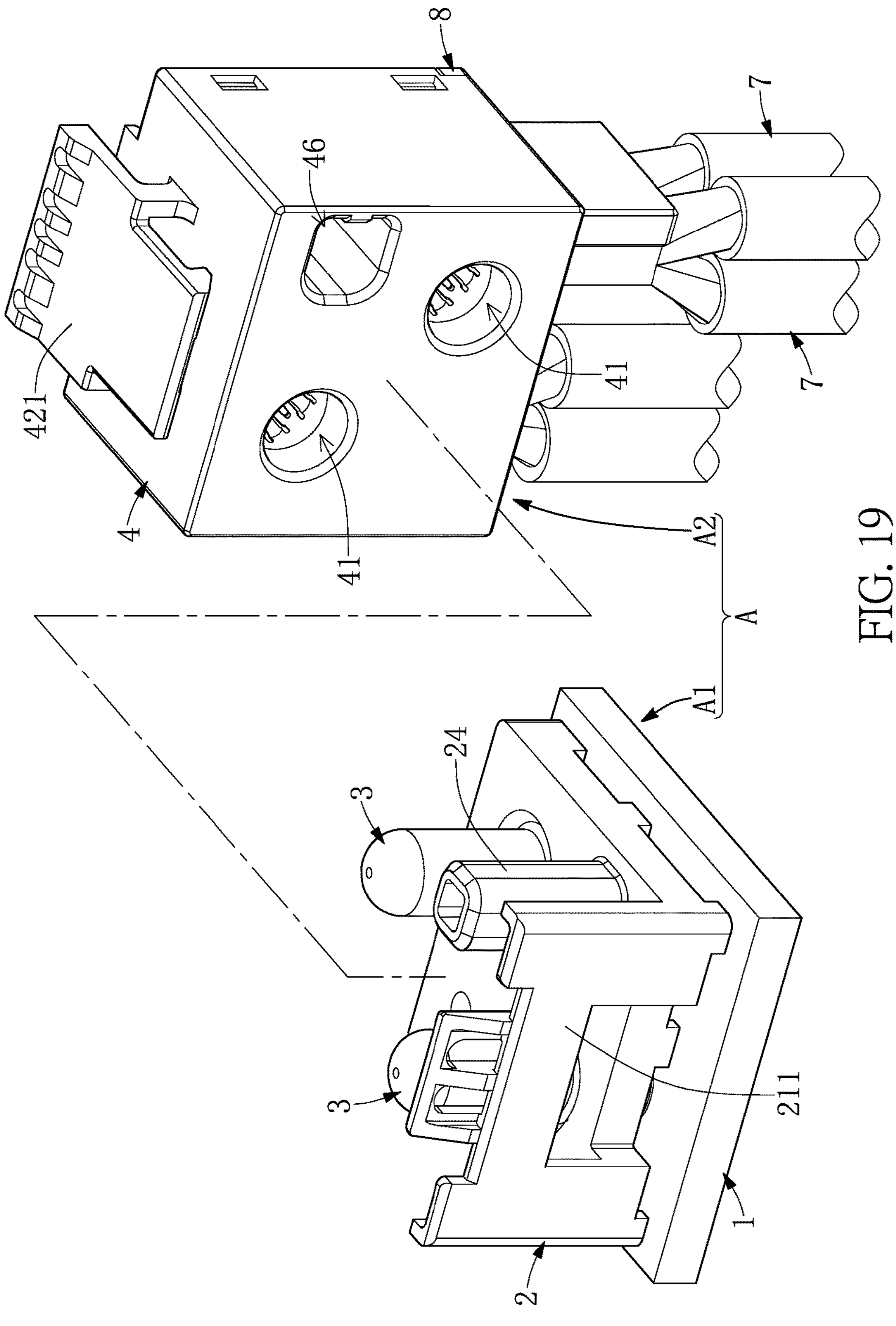
FIG. 19 is a schematic exploded view of the connector assembly according to a fourth embodiment of the present disclosure.

As shown in FIG. 19, the differences between the present embodiment and the third embodiment are described as follows: the board connector A1 and the cable connector A2 respectively include a board auxiliary limiting structure 24 and a cable auxiliary limiting structure 46, the board auxiliary limiting structure 24 is substantially a rectangular columnar structure, and the cable auxiliary limiting structures 46 is a rectangular hole.

Figure 20:
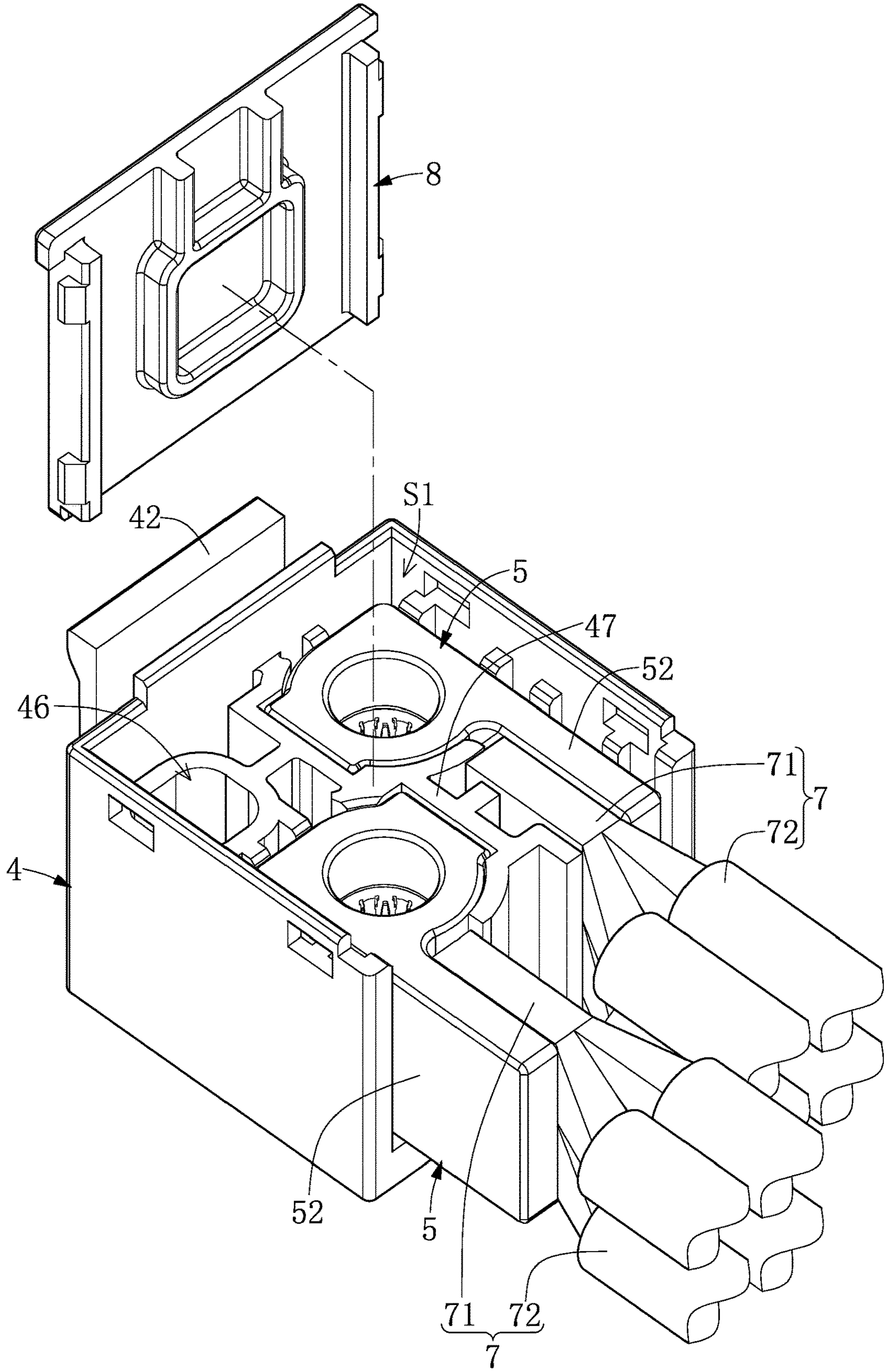
FIG. 20 is a schematic partially exploded view of the cable connector of the connector assembly according to the fourth embodiment of the present disclosure.
Figure 21:
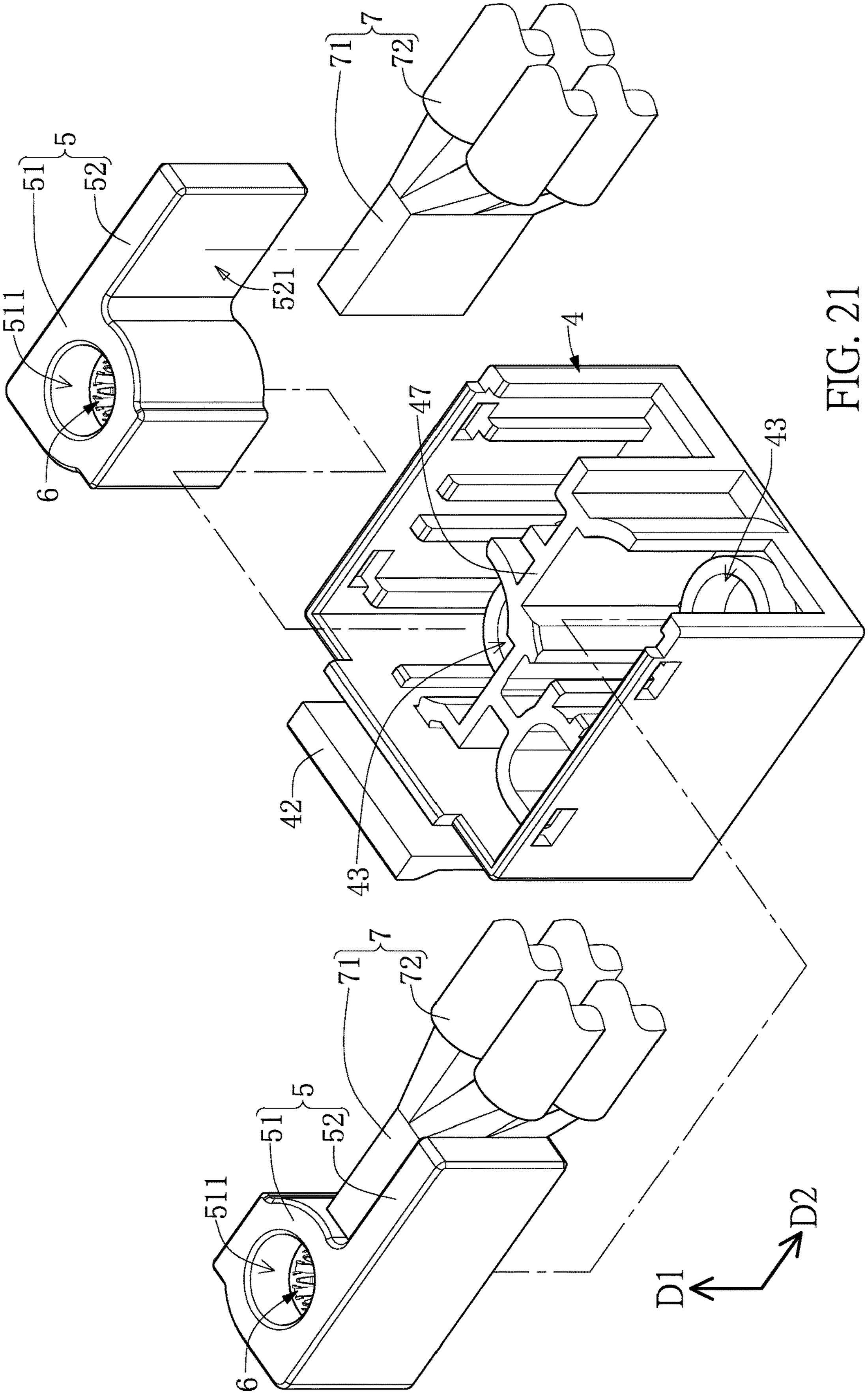
FIG. 21 is a schematic partially exploded view of the connector assembly according to the fourth embodiment of the present disclosure.

As shown in FIG. 20 and FIG. 21, the differences between the present embodiment and the previous embodiments are described as follows: the cap 8 does not include the block wall structure 82 as shown in FIG. 8 and FIG. 10, and the cable insulation seat 4 has a block wall structure 47. The accommodating space S1 is divided into two partitions through the block wall structure 47, the two engaging grooves 43 are respectively located in the two partitions, and the two conductive members 5 fixed and disposed in the two engaging grooves 43 are separated from each other through the block wall structure 47. Accordingly, the block wall structure 47 can be configured to prevent the two conductive members 5 from affecting with each other.

As shown in FIG. 4, the insertion slot 511 of each of the two conductive members 5 penetrates through the main body 51 of the conductive member 5 along a first axial direction D1, and the connection portion 52 of each of the two conductive members 5 extends from the main body 51 along the first axial direction D1.

As shown in FIG. 21, the insertion slot 511 of each of the two conductive members 5 in the present embodiment penetrates through the main body 51 of the conductive member 5 along the first axial direction D1, and the connection portion 52 extends from the main body 51 along a second axial direction D2. The second axial direction D2 is not parallel to the first axial direction D1.

Figure 22:
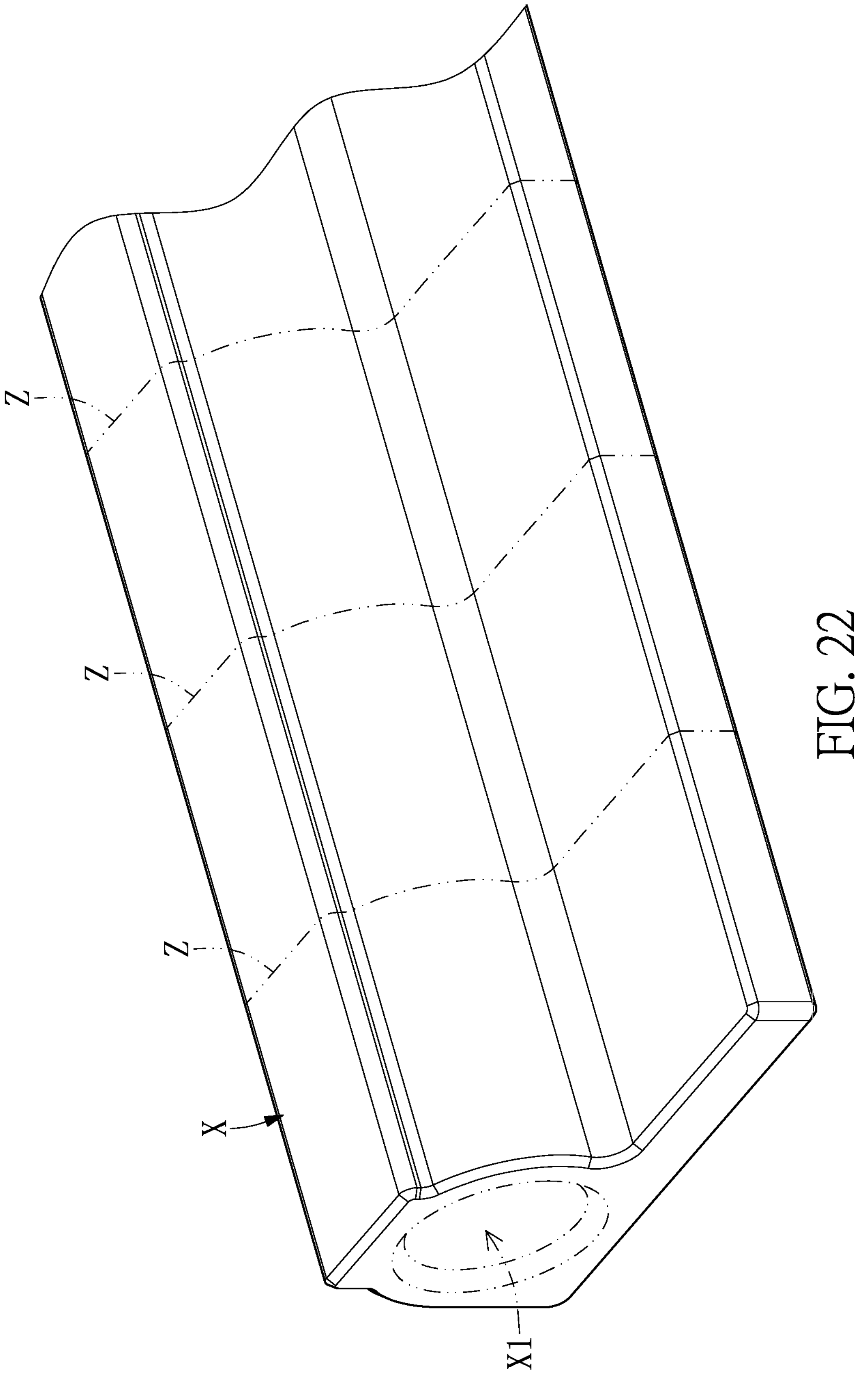
FIG. 22 is a schematic view showing a semi-finished product provided from a manufacturing process of the conductive member of the connector assembly according to the fourth embodiment of the present disclosure.
Figure 23:
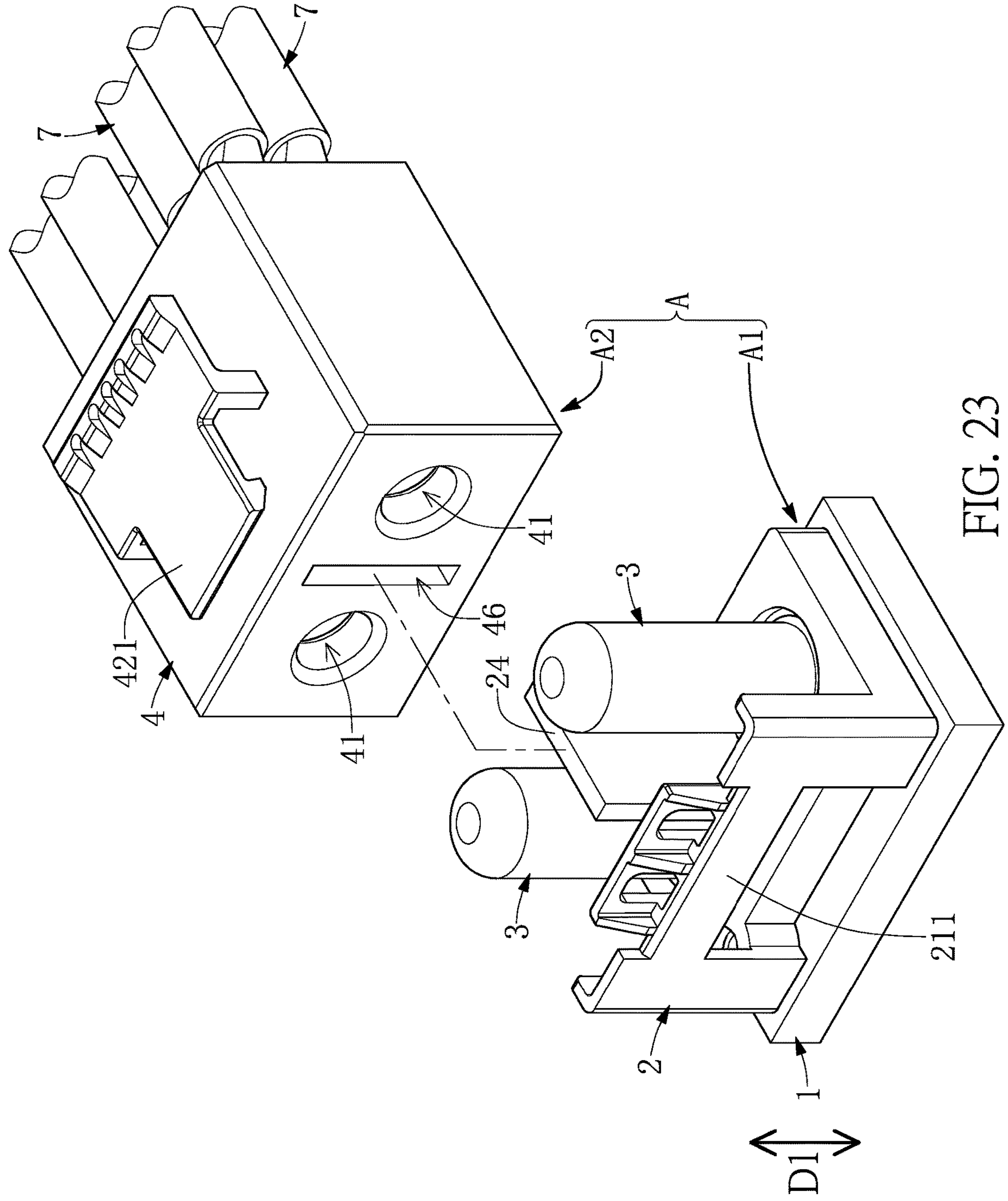
FIG. 23 is a schematic exploded view of the connector assembly according to a fifth embodiment of the present disclosure.

As shown in FIG. 22, through the above-mentioned design, a semi-finished product X as shown in FIG. 22 can be manufactured directly through a simple manufacturing process, and subsequent processes are implemented by drilling a thicker part of the semi-finished product X to form a penetrating hole X1 (the penetrating hole X1 defines the insertion slot 511 of each of the conductive members 5) and cutting the semi-finished product X (e.g., cutting the semi-finished product X along a cutting line Z as shown in FIG. 22), such that the two conductive members 5 of the present embodiment can be manufactured.

Fifth Embodiment

As shown in FIG. 23 to FIG. 28, the cable connector A2 is inserted into the board connector A1 along an insertion direction (that is identical to the first axial direction D1), the cables 7 are also fixed and disposed in the cable insulation seat 4 of the cable connector A2 along the insertion direction, and the cable connector A2 can be provided without the cap 8. In addition, the board auxiliary limiting structure 24 of the board connector A1 can be substantially in the shape of a rectangular sheet, and the board auxiliary limiting structure 24 is located between the two conductive pillars 3. On the other hand, the cable auxiliary limiting structure 46 is located between the two through holes 41 of the cable insulation seat 4.

Figure 24:
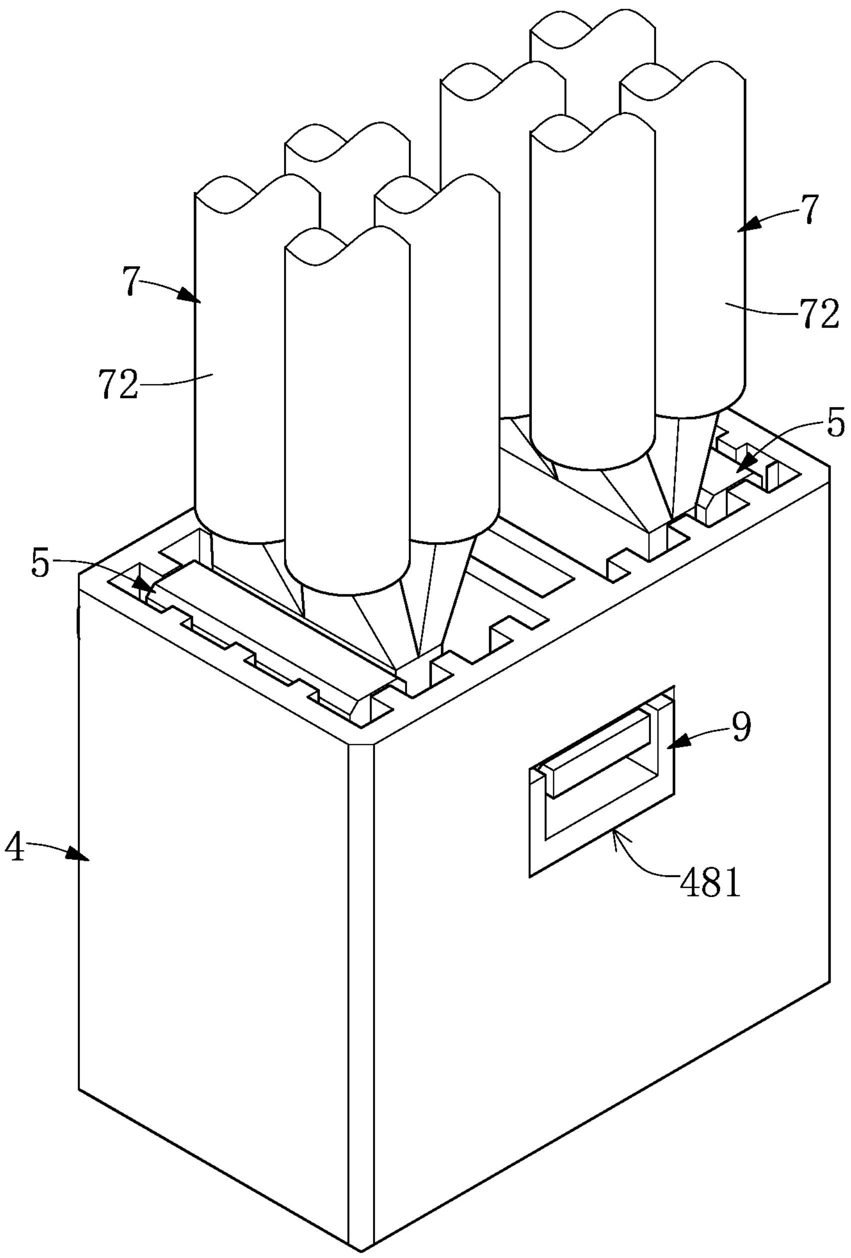
FIG. 24 is a schematic partially enlarged view of the connector assembly according to the fifth embodiment of the present disclosure.
Figure 25:
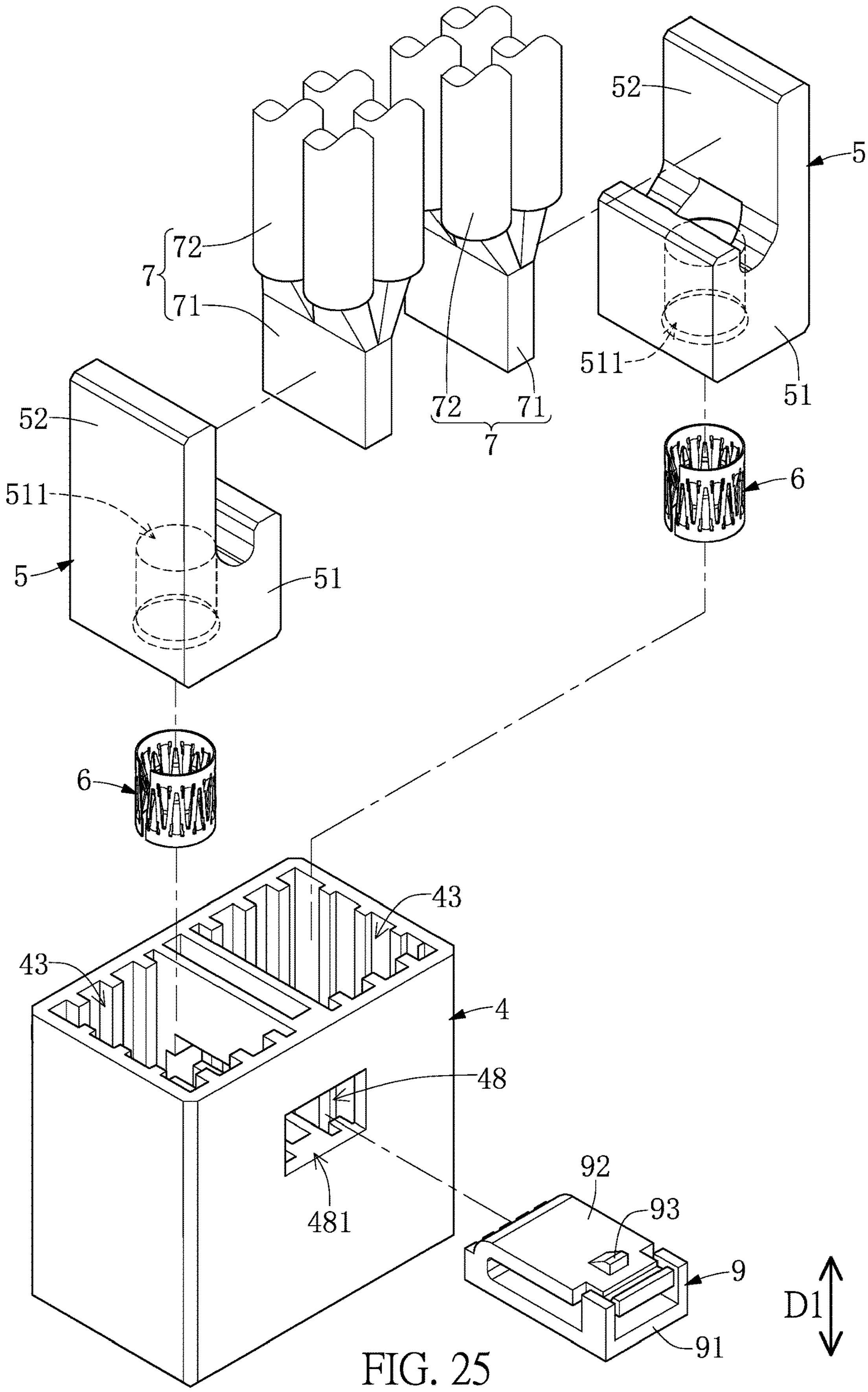
FIG. 25 is a schematic partially exploded view of the cable connector of the connector assembly according to the fifth embodiment of the present disclosure.

As shown in FIG. 24 and FIG. 25, the insertion slot 511 of each of the two conductive members 5 penetrates through the main body 51 along the first axial direction D1, the connection portion 52 extends from one side of the main body 51 along the first axial direction D1, and the main body 51 is substantially a rectangular cube. Accordingly, the two conductive members 5 of the present embodiment can be mass produced more easily and quickly, thereby achieving the technical effect of reducing production costs.

Figure 26:
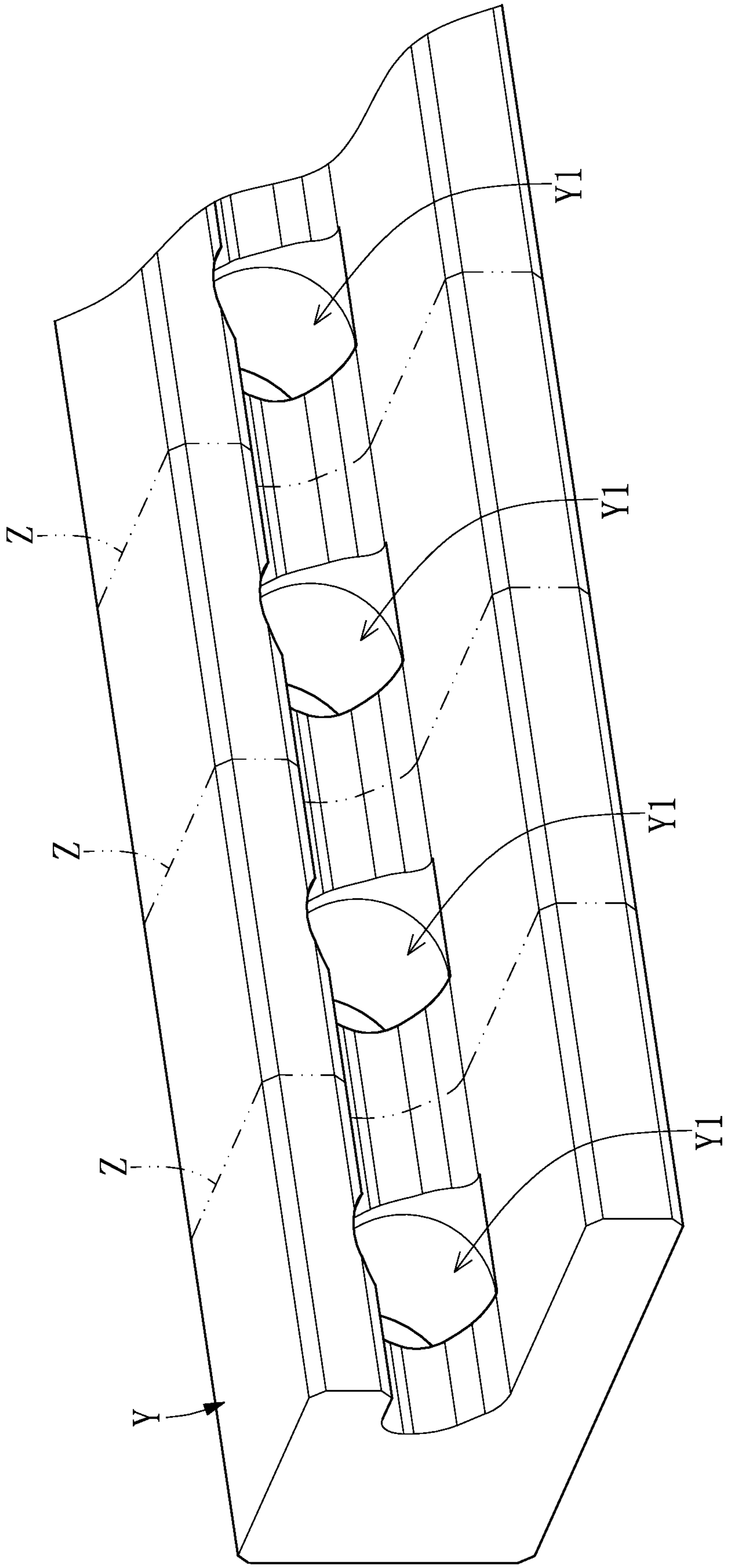
FIG. 26 is a schematic view of the semi-finished product provided from the manufacturing process of the conductive member of the connector assembly according to the fifth embodiment of the present disclosure.

As shown in FIG. 26, through the above-mentioned design of the two conductive members 5 of the present embodiment, a semi-finished product Y can be manufactured through a simple manufacturing process, and subsequent processes are implemented by drilling a thicker part of the semi-finished product Y to form a penetrating hole Y1 (the penetrating hole Y1 defines the insertion slot 511 of each of the conductive members 5) and cutting the semi-finished product Y (e.g., cutting the semi-finished product Y along the cutting line Z in the drawing), such that the conductive member 5 of the present embodiment can be manufactured.

As shown in FIG. 24, FIG. 25, FIG. 27, and FIG. 28, the cable insulation seat 4 of the present embodiment includes an engaging groove 48, the engaging groove 48 has an opening 481 arranged on a side of the cable insulation seat 4, and the engaging groove 48 accommodates an auxiliary fixing member 9. The auxiliary fixing member 9 includes a main body 91, an elastic arm 92, and a limiting structure 93. The elastic arm 92 extends from one side of the main body 91, and the limiting structure 93 is arranged on one side of the elastic arm 92 that is opposite to the main body 91. The auxiliary fixing member 9 can be fixed in the engaging groove 48 through the opening 481. When the auxiliary fixing member 9 is fixed in the engaging groove 48, the elastic arm 92 is pressed and elastically deformed, and the limiting structure 93 can abut against a barrier structure 49 of the cable insulation seat 4, such that the auxiliary fixing member 9 is unable to leave from the cable insulation seat 4. When the elastic arm 92 of the auxiliary fixing member 9 arranged in the cable insulation seat 4 is pressed, the limiting structure 93 does not abut against the barrier structure 49, and the auxiliary fixing member 9 can leave from the engaging groove 48.

Figure 27:
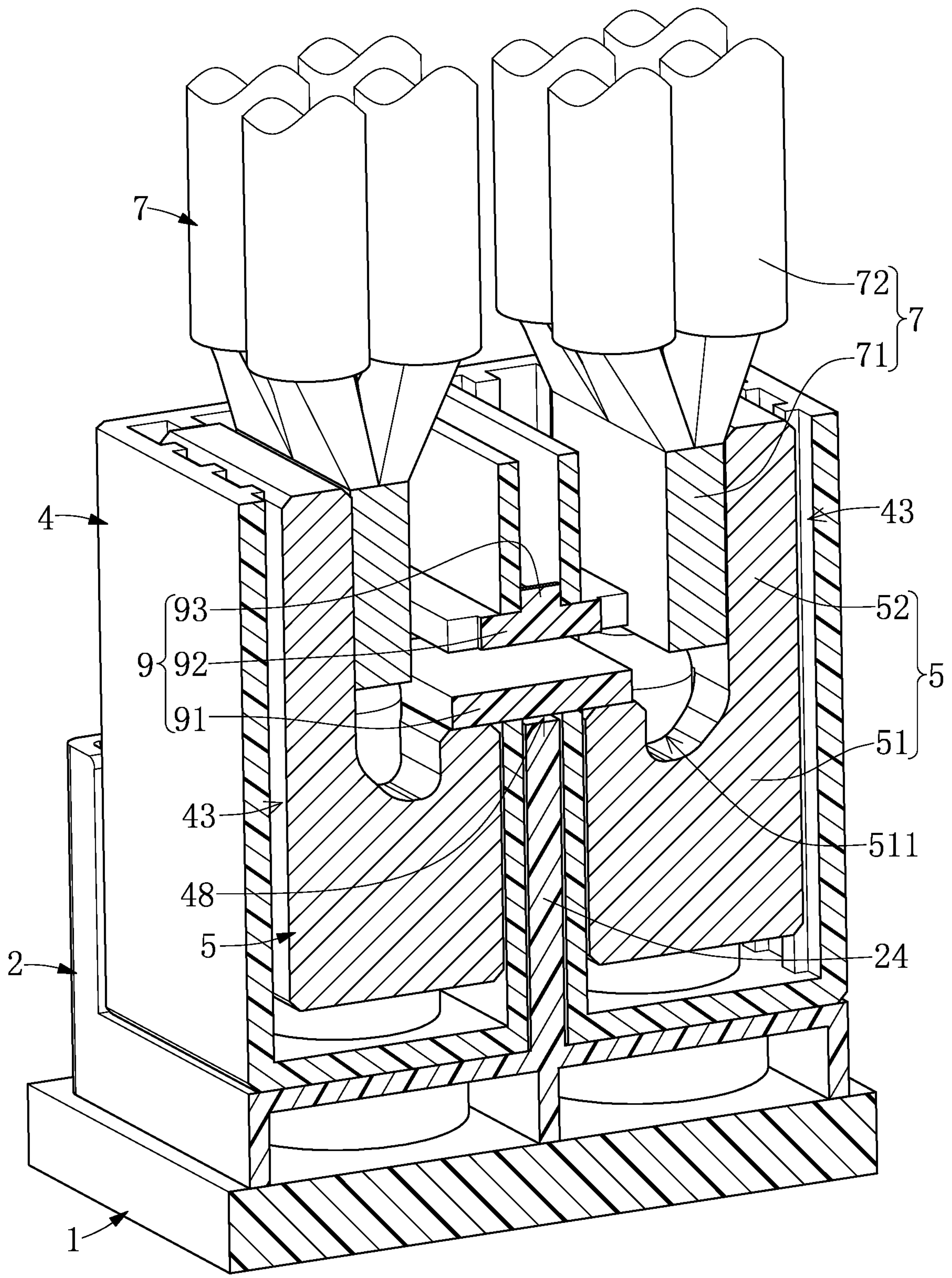
FIG. 27 and FIG. 28 are schematic cross-sectional views showing the connector assembly in different angles of viewing according to the fifth embodiment of the present disclosure.
Figure 28:
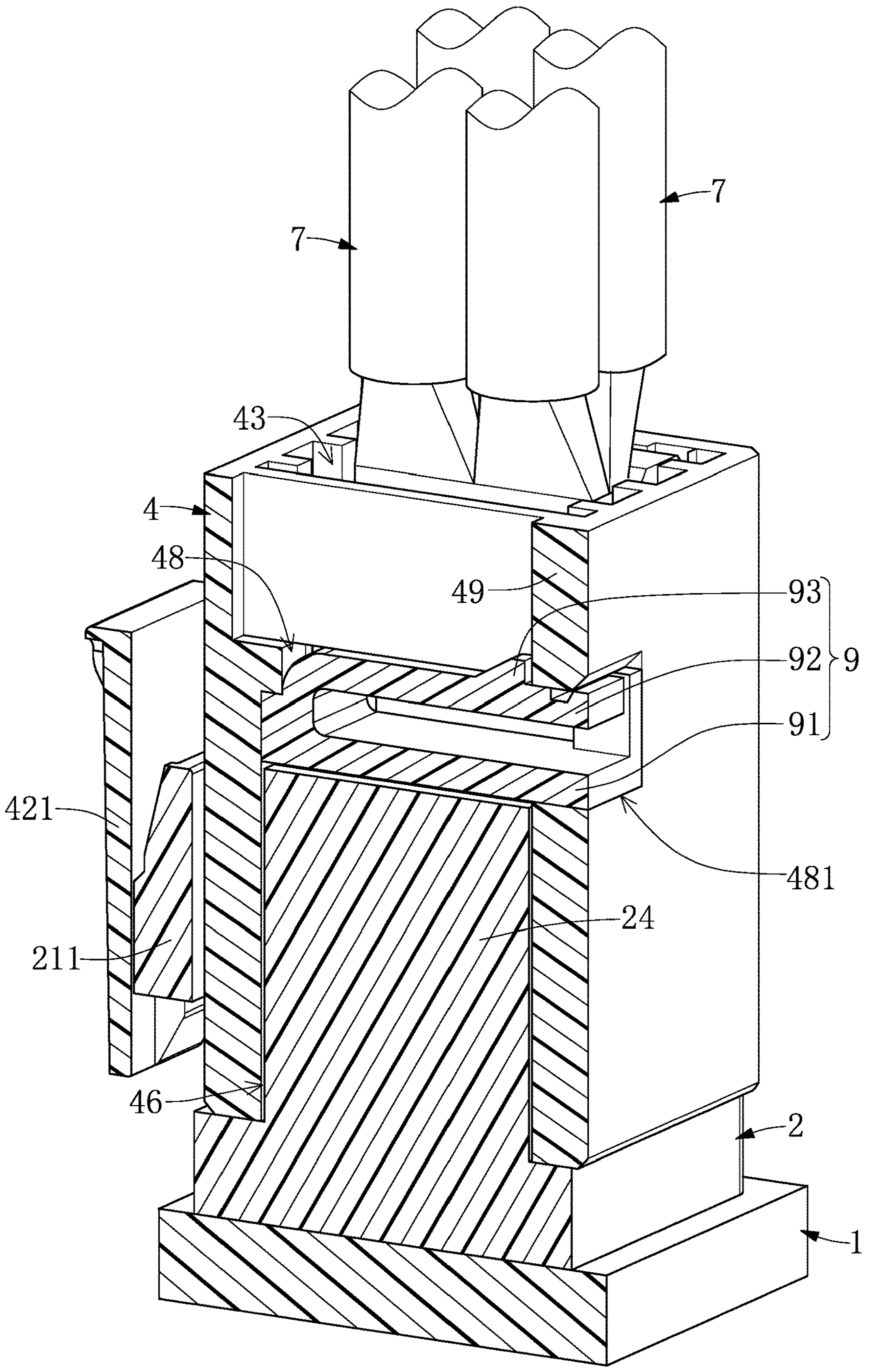

As shown in FIG. 27, when the auxiliary fixing member 9 is fixed in the engaging groove 48, a part of the auxiliary fixing member 9 can correspondingly block a part of one of the two conductive members 5 to assist in limiting the movement range of the conductive member 5 in the cable insulation seat 4.

BENEFICIAL EFFECTS OF THE EMBODIMENTS

Therefore, through the structural design of the cable locking mechanism and the board locking mechanism provided by the present disclosure, the board connector and the cable connector can effectively improve the loosening and the up-down sliding issues, and ensure the stability of the connection between the cable connector and the board connector when the board connector and the cable connector are inserted with each other.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A connector assembly, comprising:
a board connector including:
a circuit board;
a board insulation seat fixed on the circuit board, and the board insulation seat including a board locking mechanism; and
at least two conductive pillars fixed and disposed on the circuit board, wherein the two conductive pillars pass through the board insulation seat through two through holes of the board insulation seat; and
a cable connector including:
a cable insulation seat having two through holes, an accommodating space, and a cable locking mechanism, wherein the two through holes of the cable insulation seat and the accommodating space are in spatial communication with each other;
at least two conductive members each having one of a plurality of insertion slots, wherein the conductive member is fixed and disposed in the accommodating space, and the accommodating space is in spatial communication with an external environment through the two through holes of the cable insulation seat;
at least two cables, wherein one end of the cable is connected to a connection portion of the conductive member; and
a cap fixed to the cable insulation seat and covering the cable insulation seat;
wherein the at least two conductive pillars are respectively inserted into the insertion slots of the conductive member, and the board locking mechanism and the cable locking mechanism are engaged and fixed with each other;
wherein the cable connector includes at least one auxiliary conductive member, wherein the at least one auxiliary conductive member is a sheet structure and includes a plurality of conductive elastic arms, and the at least one auxiliary conductive member is bent and fixed in at least one of the insertion slots, and wherein, when the at least two conductive pillars are inserted into the insertion slots, at least one of the conductive elastic arms is elastically deformed by being squeezed between an inner wall of the at least one of the insertion slots and a corresponding one of the at least two conductive pillars.

2. The connector assembly according to claim 1, wherein each of the conductive members includes the connection portion having a bonding surface, and each of the cables includes a fixing structure that is fixed and disposed on the bonding surface.

3. The connector assembly according to claim 1, wherein the cable insulation seat further has at least one engaging groove, and the conductive member is engaged and fixed in the engaging groove.

4. The connector assembly according to claim 1, wherein the cable insulation seat further includes a block wall structure that is arranged in the accommodating space, and wherein the at least two conductive members are separated from each other through the block wall structure.

5. The connector assembly according to claim 1, wherein the connection portions of the conductive member is located at diagonal positions of the cable insulation seat, and the cap includes a block wall structure, and wherein, when the cap is fixed to the cable insulation seat, the accommodating space is divided into a plurality of partitions through the block wall structure.

6. The connector assembly according to claim 1, wherein the cable locking mechanism includes a sliding member that is movably disposed on the cap, and the sliding member is movable between a locked position and an unlocked position, wherein, when the sliding member is located at the locked position, a cable engaging structure of the sliding member and a board engaging structure of the board locking mechanism are engaged with each other, an resistance structure of the sliding member is located at one side of a cap limiting structure of the cap, and the resistance structure and the cap limiting structure are able to jointly limit a movement range of the sliding member relative to the board insulation seat, wherein the sliding member includes an elastic arm, and one end of the elastic arm has the resistance structure, wherein, when another end of the elastic arm is pressed, the resistance structure is elastically deformed in a direction away from the cap, and the sliding member is moved to the unlocked position, and wherein, when the sliding member is located at the unlocked position, the resistance structure is located on another side of the cap limiting structure, and the resistance structure and the cap limiting structure are able to jointly limit the movement range of the sliding member relative to the board insulation seat.

7. The connector assembly according to claim 6, wherein the sliding member is movable between the locked position, the unlocked position, and a storage position, wherein the cap includes an auxiliary limiting structure, and wherein, when the sliding member is located at the storage position, the auxiliary limiting structure is able to block the sliding member from moving to the locked position or the unlocked position.

8. The connector assembly according to claim 1, wherein the cable locking mechanism includes an elastic arm having at least one cable engaging structure arranged on one side of the elastic arm, wherein, when the cable connector and the board connector are inserted with each other, the cable engaging structure and at least one board engaging structure of the board locking mechanism are engaged with each other, and wherein, when the elastic arm is pressed and elastically deformed, the cable engaging structure is not engaged with the board locking mechanism.

9. The connector assembly according to claim 8, wherein the board locking mechanism includes a limiting portion, and wherein, when the cable connector and the board connector are inserted with each other, the limiting portion enables the elastic arm and the board locking mechanism to be engaged with each other more accurately.

10. The connector assembly according to claim 1, wherein the board insulation seat includes a plurality of board auxiliary limiting structures, and the cable connector includes a plurality of cable auxiliary limiting structures, and wherein, when the cable connector and the board connector are inserted with each other, the board auxiliary limiting structures and the cable auxiliary limiting structures are engaged with each other, such that the cable connector and the board connector are connected to each other and accurately positioned.

11. The connector assembly according to claim 1, wherein each of the conductive members includes a main body and the connection portion, and wherein, the insertion slots penetrate through the main body along a first axial direction, the connection portion extends from the main body along a second axial direction, and the first axial direction is not parallel to the second axial direction.

* * * * *